(12) United States Patent
Wen et al.

(10) Patent No.: US 12,494,847 B2
(45) Date of Patent: Dec. 9, 2025

(54) OPTICAL SIGNAL TRANSMITTING DEVICE, OPTICAL SIGNAL RECEIVING DEVICE, AND OPTICAL SIGNAL TRANSMISSION SYSTEM

(71) Applicant: HUAWEI TECHNOLOGIES CO., LTD., Shenzhen (CN)

(72) Inventors: Yue Wen, Shenzhen (CN); Wendou Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

(21) Appl. No.: 18/189,212

(22) Filed: Mar. 24, 2023

(65) Prior Publication Data

US 2023/0231643 A1   Jul. 20, 2023

Related U.S. Application Data

(63) Continuation of application No. PCT/CN2021/115252, filed on Aug. 30, 2021.

(30) Foreign Application Priority Data

Sep. 25, 2020  (CN) .......................... 202011027437.6

(51) Int. Cl.
*H04B 10/50* (2013.01)
*H04J 14/00* (2006.01)
*H04J 14/02* (2006.01)

(52) U.S. Cl.
CPC ........ *H04B 10/503* (2013.01); *H04J 14/0307* (2023.08); *H04J 14/05* (2023.08); *H04J 14/052* (2023.08)

(58) Field of Classification Search
None
See application file for complete search history.

(56) References Cited

U.S. PATENT DOCUMENTS 5,506,711 A  4/1996 Takeyari
6,445,514 B1  9/2002 Ohnstein et al.
(Continued)

FOREIGN PATENT DOCUMENTS

CN  101136701 A  3/2008
CN  101171879 A  4/2008
(Continued)

OTHER PUBLICATIONS

Philippe Genevaux et al., 6-mode Spatial Multiplexer with Low Loss and High Selectivity for Transmission over Few Mode Fiber, OFC 2015 OSA 2015, 3 pages.
(Continued)

*Primary Examiner* — Darren E Wolf

(57) ABSTRACT

An optical signal transmitting device comprises an optical transmitter and a mode converter. The optical transmitter transmits a multi-path transmitted initial optical signal to the mode converter, wherein the initial optical signal comprises a first optical signal and a second optical signal both having a first wavelength, and a third optical signal having a second wavelength different from first wavelength. The mode converter is configured to perform phase conversion on the incident initial optical signal to obtain and reflect a first target optical signal, which is single-path transmitted and comprises the third optical signal, the first optical signal transmitted in a first mode, and the second optical signal transmitted in a second mode different from the first mode.

18 Claims, 10 Drawing Sheets

(56) References Cited

U.S. PATENT DOCUMENTS

| | | | |
|---|---|---|---|
| 8,320,769 B2 | 11/2012 | Essiambre et al. | |
| 9,705,630 B2 | 7/2017 | Liboiron-Ladouceur et al. | |
| 9,712,239 B2 | 7/2017 | Murshid et al. | |
| 9,917,672 B2 | 3/2018 | Jensen et al. | |
| 10,230,468 B2 | 3/2019 | Mansouri Rad et al. | |
| 2011/0243490 A1* | 10/2011 | Ryf | G02B 6/29311 385/28 |
| 2012/0177384 A1* | 7/2012 | Ryf | H04B 10/2581 385/24 |
| 2016/0057517 A1* | 2/2016 | Coca | H04Q 11/0005 398/45 |
| 2017/0214465 A1* | 7/2017 | Milione | H04B 10/40 |
| 2017/0299812 A1* | 10/2017 | Zhao | G02B 6/126 |
| 2019/0356391 A1 | 11/2019 | Murshid et al. | |
| 2020/0073054 A1 | 3/2020 | Yang et al. | |
| 2020/0204260 A1 | 6/2020 | Wang et al. | |

FOREIGN PATENT DOCUMENTS

| | | |
|---|---|---|
| CN | 102224692 B | 4/2014 |
| CN | 106411452 A | 2/2017 |
| CN | 106936500 A | 7/2017 |
| CN | 108551367 A | 9/2018 |
| CN | 106877970 B | 7/2019 |
| CN | 209446843 U | 9/2019 |
| CN | 111698583 A | 9/2020 |
| EP | 3091678 A1 | 11/2016 |
| JP | 3593291 B2 | 11/2004 |
| KR | 20180131319 A | 12/2018 |

OTHER PUBLICATIONS

Hao Jia et al., Microring modulator matrix integrated with mode multiplexer and de-multiplexer for on-chip optical interconnect, 2016 IEEE, 2 pages.

* cited by examiner

OPTICAL SIGNAL TRANSMITTING DEVICE, OPTICAL SIGNAL RECEIVING DEVICE, AND OPTICAL SIGNAL TRANSMISSION SYSTEM

CROSS-REFERENCE TO RELATED APPLICATIONS

This disclosure is a continuation of International Application No. PCT/CN2021/115252, filed on Aug. 30, 2021, which claims priority to Chinese Patent Application 202011027437.6, filed on Sep. 25, 2020. The disclosures of the aforementioned priority applications are hereby incorporated by reference in their entirety.

TECHNICAL FIELD

This disclosure relates to the optical signal transmission field, and in particular, to an optical signal transmitting device, an optical signal receiving device, and an optical signal transmission system.

BACKGROUND

With the promotion of OM5 multi-mode optical fibers and the large-scale deployment of 40G/100G data center transmission networks, short wavelength division multiplexing (SWDM) technologies are gradually applied. Short wavelength division multiplexing SWDM refers to expanding, by using a wavelength division multiplexing (WDM) technology of a single-mode optical fiber, a wavelength range used during transmission from 850 nanometers (nm) used by a conventional multi-mode optical fiber to 850 nm to 950 nm.

Currently, in a data transmission process in which the SWDM technology is applied, a cost-effective short-wave vertical-cavity surface-emitting laser (VCSEL) light source is used to support transmitting data of a plurality of wavelengths on one multi-mode optical fiber, and this can extend a transmission distance while improving an effective modal bandwidth (EMB) of the multi-mode optical fiber. Generally, because a wavelength shift of a VCSEL is 20 nm, to avoid transmission interference between the plurality of wavelengths, the current SWDM technology uses operating wavelengths of 850 nm, 880 nm, 910 nm, and 940 nm (starting from 850 nm, and with one wavelength being added every 30 nm).

However, implementation of the SMWD technology is limited by a technical limit of a VCSEL material, and capacity expansion is challenging. Currently, a wavelength division multiplexing-based capacity expansion solution is urgently required in the field of optical fiber data transmission.

SUMMARY

Embodiments of this disclosure provide an optical signal transmitting device, an optical signal receiving device, and an optical signal transmission system, to implement, via a mode converter, mode division multiplexing and wavelength division multiplexing of a multi-path transmitted optical signal. This expands a capacity of the optical signal transmission system.

A first aspect of embodiments of this disclosure provides an optical signal transmitting device, including an optical transmitter and a mode converter. In the optical signal transmitting device, the optical transmitter is configured to transmit an initial optical signal to the mode converter, where the initial optical signal is a multi-path transmitted optical signal, and the initial optical signal includes a first optical signal and a second optical signal whose wavelengths are a first wavelength, and a third optical signal whose wavelength is a second wavelength, and the first wavelength is different from the second wavelength; and the mode converter is configured to perform phase conversion on the incident initial optical signal, to obtain and reflect a first target optical signal, where the first target optical signal is a single-path transmitted optical signal, and the first target optical signal includes the third optical signal, the first optical signal transmitted in a first mode, and the second optical signal transmitted in a second mode, and the first mode is different from the second mode.

Based on the foregoing technical solutions, the mode converter in the optical signal transmitting device performs phase conversion on the multi-path transmitted initial optical signal to obtain the single-path transmitted first target optical signal, where the initial optical signal includes the first optical signal and the second optical signal whose wavelengths are the first wavelength, and the third optical signal whose wavelength is the second wavelength, the first target optical signal includes the third optical signal, the first optical signal that is transmitted in the first mode and whose wavelength is the first wavelength, and the second optical signal that is transmitted in the second mode and whose wavelength is the first wavelength, the first wavelength is different from the second wavelength, and the first mode is different from the second mode. In other words, the optical signal transmitting device implements, via the mode converter, mode division multiplexing and wavelength division multiplexing of the multi-path transmitted initial optical signal. This expands the capacity of the optical signal transmission system.

It should be noted that there are at least two paths of optical signals with a same wavelength in the initial optical signal transmitted by the optical transmitter. In this embodiment and subsequent embodiments, the at least two paths of optical signals with the same wavelength may be transmitted in a same mode, for example, both are in a high-order mode, a low-order mode, a ground mode, or another mode; or may be transmitted in different transmission modes, for example, a different mode in a high-order mode, a low-order mode, a ground mode, or another mode. This is not limited herein.

In a possible implementation of the first aspect of embodiments of this disclosure, the mode converter includes a first phase pattern, a first thin film filter TFF, a second phase pattern, and a second TFF, where the first TFF is configured to reflect an optical signal of the first wavelength and transmit an optical signal of the second wavelength, and the second TFF is configured to reflect an optical signal of the second wavelength and transmit an optical signal of the first wavelength; after the first phase pattern is used to perform phase conversion on the incident initial optical signal to obtain a second target optical signal, and reflect the second target optical signal to the first TFF, the first TFF reflects the incident second target optical signal along a first axis, where the second target optical signal includes the first optical signal that is transmitted in the first mode and whose wavelength is the first wavelength and the second optical signal that is transmitted in the second mode and whose wavelength is the first wavelength; and after the second phase pattern is used to perform phase conversion on the incident initial optical signal to obtain the third optical signal, and reflect the third optical signal to the second TFF, the second TFF reflects the incident third optical signal to the first TFF along the first axis.

Based on the foregoing technical solutions, the mode converter can implement mode division multiplexing of the initial optical signal by using the first phase pattern and the second phase pattern based on a difference between the first wavelength and the second wavelength of the initial optical signal to obtain the second target optical signal and the third optical signal; and then, converge the second target optical signal and the third optical signal along the same first axis by using the first TFF corresponding to the first wavelength and the second TFF corresponding to the second wavelength for reflection to obtain the first target optical signal. This provides a specific implementation of mode division multiplexing and wavelength division multiplexing of the initial optical signal by using a plurality of phase patterns and a plurality of TFFs in the mode converter, and improves feasibility of the solution.

In a possible implementation of the first aspect of embodiments of this disclosure, at least one phase pattern of the first phase pattern and at least one phase pattern of the second phase pattern are integrated on a same phase plate.

Based on the foregoing technical solutions, in a scenario in which the mode converter is implemented by using the plurality of phase patterns and the plurality of TFFs, the at least one phase pattern of the first phase pattern and the at least one phase pattern of the second phase pattern can be integrated on the same phase plate. In other words, in different phase patterns, at least some phase patterns may be integrated on a same phase plate for implementation. This can optimize a spatial layout inside the mode converter, and reduce a volume of the optical signal transmitting device.

In a possible implementation of the first aspect of embodiments of this disclosure, the at least one phase pattern of the second phase pattern and the first TFF are integrated on a same phase plate.

Based on the foregoing technical solutions, in the scenario in which the mode converter is implemented by using the plurality of phase patterns and the plurality of TFFs, the at least one phase pattern of the second phase pattern and the first TFF are integrated on the same phase plate, that is, the phase pattern and the TFF can be integrated on the same phase plate for implementation. This can optimize the spatial layout inside the mode converter, and reduce the volume of the optical signal transmitting device.

In a possible implementation of the first aspect of embodiments of this disclosure, the mode converter includes a third phase pattern and a multiplexer; the third phase pattern is used to perform phase conversion on the incident initial optical signal to obtain a third target optical signal, and reflect the third target optical signal to the multiplexer, where the third target optical signal is a multi-path transmitted optical signal, and the third target optical signal includes the first optical signal that is transmitted in the first mode and whose wavelength is the first wavelength, the second optical signal that is transmitted in the second mode and whose wavelength is the first wavelength, and the third optical signal whose wavelength is the second wavelength, and the multiplexer is configured to perform multiplexing processing on the incident third target optical signal, to obtain and reflect the first target optical signal.

Based on the foregoing technical solutions, the mode converter can implement mode division multiplexing of the initial optical signal by using the third phase pattern to obtain the third target optical signal; and then converge, by using the multiplexer, the third target optical signal in the multiplexer for reflection, to obtain and reflect the first target optical signal. This provides a specific implementation of mode division multiplexing and wavelength division multiplexing of the initial optical signal by using the phase pattern and the multiplexer in the mode converter, and improves feasibility of the solution.

In a possible implementation of the first aspect of embodiments of this disclosure, a quantity of phase patterns in the third phase pattern is an integer multiple of a quantity of wavelengths corresponding to the initial optical signal.

Based on the foregoing technical solutions, the third phase pattern in the mode converter can include a plurality of phase patterns. This can implement mode division multiplexing of the optical signal with different wavelengths by using one or more phase patterns based on different wavelengths of the initial optical signal, that is, implement flexible configuration of the phase patterns based on the different wavelengths of the initial optical signal.

In a possible implementation of the first aspect of embodiments of this disclosure, the mode converter includes a fourth phase pattern, and the fourth phase pattern is used to perform phase conversion on the incident initial optical signal, to obtain and reflect the first target optical signal.

Based on the foregoing technical solutions, the mode converter can implement mode division multiplexing and wavelength division multiplexing of the initial optical signal by using the fourth phase pattern. This provides a specific implementation of mode division multiplexing and wavelength division multiplexing of the initial optical signal by using the phase pattern in the mode converter, and improves feasibility of the solution.

In a possible implementation of the first aspect of embodiments of this disclosure, the fourth phase pattern includes a fifth phase pattern and a sixth phase pattern; the fifth phase pattern is used to perform phase conversion on the incident initial optical signal to obtain a fourth target optical signal, and reflect the fourth target optical signal to the sixth phase pattern, where the fourth target optical signal is a multi-path transmitted optical signal, and the fourth target optical signal includes the first optical signal that is transmitted in the first mode and whose wavelength is the first wavelength, the second optical signal that is transmitted in the second mode and whose wavelength is the first wavelength, and the third optical signal whose wavelength is the second wavelength; and the sixth phase pattern is used to perform multiplexing processing on the incident fourth target optical signal, to obtain and reflect the first target optical signal.

Based on the foregoing technical solutions, in the solution in which the mode converter implements mode division multiplexing and wavelength division multiplexing of the initial optical signal by using the fourth phase pattern, the fourth phase pattern can include the fifth phase pattern and the sixth phase pattern. The fifth phase pattern is used to perform phase conversion on the initial optical signal to obtain the fourth target optical signal. The sixth phase pattern is used to perform multiplexing processing on the fourth target optical signal, to obtain and reflect the first target optical signal. This provides specific implementations of the fifth phase pattern and the sixth phase pattern in the fourth phase pattern in the mode converter, and improves feasibility of the solution.

In a possible implementation of the first aspect of embodiments of this disclosure, the fourth phase pattern includes a seventh phase pattern and an eighth phase pattern; the seventh phase pattern is used to perform multiplexing processing on the incident initial optical signal to obtain a fifth target optical signal, and reflect the fifth target optical signal to the eighth phase pattern, where the fifth target optical signal is a single-path transmitted optical signal, and the fifth target optical signal includes the first optical signal and the second optical signal whose wavelengths are the first wavelength, and the third optical signal whose wavelength is the second wavelength; and the eighth phase pattern is used to perform phase conversion on the fifth target optical signal, to obtain and reflect the first target optical signal.

Based on the foregoing technical solutions, in the solution in which the mode converter implements mode division multiplexing and wavelength division multiplexing of the initial optical signal by using the fourth phase pattern, the fourth phase pattern can include the seventh phase pattern and the eighth phase pattern. The seventh phase pattern is used to perform multiplexing processing on the initial optical signal to obtain the fifth target optical signal. The eighth phase pattern is used to perform phase conversion on the fifth target optical signal, to obtain and reflect the first target optical signal. This provides specific implementations of the seventh phase pattern and the eighth phase pattern in the fourth phase pattern in the mode converter, and improves feasibility of the solution.

In a possible implementation of the first aspect of embodiments of this disclosure, in the initial optical signal, the first optical signal, the second optical signal, and the third optical signal are parallel to each other.

Based on the foregoing technical solutions, in the optical signal transmitting device, different optical signals included in the initial optical signal transmitted by the optical transmitter can be parallel to each other. This can avoid optical signal interference between the different optical signals included in the initial optical signal, and improve transmission efficiency of the optical signal.

A second aspect of embodiments of this disclosure provides an optical signal receiving device, including a mode converter and an optical receiver. In the optical signal receiving device, the mode converter is configured to perform phase conversion on an incident initial optical signal to obtain a first target optical signal, and reflect the first target optical signal to the optical receiver; and the initial optical signal is a single-path transmitted optical signal, the initial optical signal includes a first optical signal that is transmitted in a first mode and whose wavelength is a first wavelength, a second optical signal that is transmitted in a second mode and whose wavelength is the first wavelength, and a third optical signal whose wavelength is a second wavelength, the first wavelength is different from the second wavelength, the first mode is different from the second mode, the first target optical signal is a multi-path transmitted optical signal, and the first target optical signal includes the third optical signal, and the first optical signal and the second optical signal whose wavelengths are the first wavelength.

It should be noted that there are at least two paths of optical signals with a same wavelength in the first target optical signal received by the optical receiver. In this embodiment and subsequent embodiments, the at least two paths of optical signals with the same wavelength may be transmitted in a same mode, for example, both are in a high-order mode, a low-order mode, a ground mode, or another mode; or may be transmitted in different transmission modes, for example, a different mode in a high-order mode, a low-order mode, a ground mode, or another mode. This is not limited herein.

Based on the foregoing technical solutions, the mode converter in the optical signal receiving device performs phase conversion on the single-path transmitted initial optical signal into the multi-path transmitted first target optical signal, where the initial optical signal includes the first optical signal that is transmitted in the first mode and whose wavelength is the first wavelength, the second optical signal that is transmitted in the second mode and whose wavelength is the first wavelength, and the third optical signal whose wavelength is the second wavelength, the first wavelength is different from the second wavelength, the first mode is different from the second mode, the first target optical signal is a multi-path transmitted optical signal, and the first target optical signal includes the third optical signal, and the first optical signal and the second optical signal whose wavelengths are the first wavelength. That is, the optical signal receiving device implements, via the mode converter, mode division multiplexing and wavelength division multiplexing of the single-path transmitted initial optical signal. This expands the capacity of the optical signal transmission system.

In a possible implementation of the second aspect of embodiments of this disclosure, the mode converter includes a first phase pattern, a first thin film filter TFF, a second phase pattern, and a second TFF, where the first TFF is configured to reflect an optical signal of the first wavelength and transmit an optical signal of the second wavelength, and the second TFF is configured to reflect an optical signal of the second wavelength and transmit an optical signal of the first wavelength; after the first TFF receives the initial optical signal through a first axis, and reflects the initial optical signal to the first phase pattern, the first phase pattern is used to perform phase conversion on the incident initial optical signal to obtain a second target optical signal, and reflect the second target optical signal to the optical receiver, where the second target optical signal is a multi-path transmitted optical signal, and the second target optical signal includes the first optical signal and the second optical signal whose wavelengths are the first wavelength; and after the second TFF receives the initial optical signal through the first axis, and reflects the initial optical signal to the second phase pattern, the second phase pattern is used to perform phase conversion on the incident initial optical signal to obtain the third optical signal, and reflect the third optical signal to the optical receiver.

Based on the foregoing technical solutions, the mode converter can receive the initial optical signal by using the first TFF corresponding to the first wavelength and the second TFF corresponding to the second wavelength and through the first axis, and separately reflect the initial optical signal obtained after filtering to the first phase pattern and the second phase pattern; and then, decompose the filtered initial optical signal into the second target optical signal and the third optical signal separately by using the first phase pattern and the second phase pattern, so that the optical receiver obtains the first target optical signal based on the second target optical signal and the third optical signal. This provides a specific implementation of mode division multiplexing and wavelength division multiplexing of the initial optical signal by using a plurality of phase patterns and a plurality of TFFs in the mode converter, and improves feasibility of the solution.

In a possible implementation of the second aspect of embodiments of this disclosure, at least one phase pattern of the first phase pattern and at least one phase pattern of the second phase pattern are integrated on a same phase plate.

Based on the foregoing technical solutions, in a scenario in which the mode converter is implemented by using the plurality of phase patterns and the plurality of TFFs, the at least one phase pattern of the first phase pattern and the at least one phase pattern of the second phase pattern can be integrated on the same phase plate. In other words, in different phase patterns, at least some phase patterns may be integrated on a same phase plate for implementation. This can optimize a spatial layout inside the mode converter, and reduce a volume of the optical signal receiving device.

In a possible implementation of the second aspect of embodiments of this disclosure, the at least one phase pattern of the second phase pattern and the first TFF are integrated on a same phase plate.

Based on the foregoing technical solutions, in the scenario in which the mode converter is implemented by using the plurality of phase patterns and the plurality of TFFs, the at least one phase pattern of the second phase pattern and the first TFF are integrated on the same phase plate, that is, the phase pattern and the TFF can be integrated on the same phase plate for implementation. This can optimize the spatial layout inside the mode converter, and reduce the volume of the optical signal receiving device.

In a possible implementation of the second aspect of embodiments of this disclosure, the mode converter includes a third phase pattern and a demultiplexer; the demultiplexer is configured to: perform demultiplexing processing on the incident initial optical signal to obtain a third target optical signal, and reflect the third target optical signal to the third phase pattern, where the third target optical signal is a multi-path transmitted optical signal, and the third target optical signal includes the first optical signal, the second optical signal, and the third optical signal; and the third phase pattern is used to perform phase conversion on the incident third target optical signal to obtain the first target optical signal, and reflect the first target optical signal to the optical receiver.

Based on the foregoing technical solutions, the mode converter can decompose, via the demultiplexer, the initial optical signal into the multi-path transmitted third target optical signal, and reflect the third target optical signal to the third phase pattern; and then, implement mode division multiplexing of and perform phase conversion on the third target optical signal by using the third phase pattern to obtain the first target optical signal. This provides a specific implementation of mode division multiplexing and wavelength division multiplexing of the initial optical signal by using the demultiplexer and the phase pattern in the mode converter, and improves feasibility of the solution.

In a possible implementation of the second aspect of embodiments of this disclosure, a quantity of phase patterns in the third phase pattern is an integer multiple of a quantity of wavelengths corresponding to the initial optical signal.

Based on the foregoing technical solutions, the third phase pattern in the mode converter can include a plurality of phase patterns. This can implement mode division multiplexing of the optical signal with different wavelengths by using one or more phase patterns based on different wavelengths of the initial optical signal, that is, implement flexible configuration of the phase patterns based on the different wavelengths of the initial optical signal.

In a possible implementation of the second aspect of embodiments of this disclosure, the mode converter includes a fourth phase pattern, and the fourth phase pattern is used to perform phase conversion on the incident initial optical signal to obtain the first target optical signal, and reflect the first target optical signal to the optical receiver.

Based on the foregoing technical solutions, the mode converter can implement mode division multiplexing and wavelength division multiplexing of the initial optical signal by using the fourth phase pattern. This provides a specific implementation of mode division multiplexing and wavelength division multiplexing of the initial optical signal by using the phase pattern in the mode converter, and improves feasibility of the solution.

In a possible implementation of the second aspect of embodiments of this disclosure, the fourth phase pattern includes a fifth phase pattern and a sixth phase pattern; the fifth phase pattern is used to perform phase conversion on the incident initial optical signal to obtain a fourth target optical signal, and reflect the fourth target optical signal to the sixth phase pattern, where the fourth target optical signal is a single-path transmitted optical signal, and the fourth target optical signal includes the first optical signal and the second optical signal whose wavelengths are the first wavelength, and the third optical signal whose wavelength is the second wavelength; and the sixth phase pattern is used to perform demultiplexing processing on the incident fourth target optical signal to obtain the first target optical signal, and reflect the first target optical signal to the optical receiver.

Based on the foregoing technical solutions, in the solution in which the mode converter implements mode division multiplexing and wavelength division multiplexing of the initial optical signal by using the fourth phase pattern, the fourth phase pattern can include the fifth phase pattern and the sixth phase pattern. The fifth phase pattern is used to perform phase conversion on the initial optical signal to obtain the fourth target optical signal. The sixth phase pattern is used to perform demultiplexing processing on the fourth target optical signal, to obtain and reflect the first target optical signal. This provides specific implementations of the fifth phase pattern and the sixth phase pattern in the fourth phase pattern in the mode converter, and improves feasibility of the solution.

In a possible implementation of the second aspect of embodiments of this disclosure, the fourth phase pattern includes a seventh phase pattern and an eighth phase pattern; the seventh phase pattern is used to perform demultiplexing processing on the incident initial optical signal to obtain a fifth target optical signal, and reflect the fifth target optical signal to the eighth phase pattern, where the fifth target optical signal is a multi-path transmitted optical signal, and the fifth target optical signal includes the first optical signal that is transmitted in the first mode and whose wavelength is the first wavelength, the second optical signal that is transmitted in the second mode and whose wavelength is the first wavelength, and the third optical signal whose wavelength is the second wavelength; and the eighth phase pattern is used to perform phase conversion on the incident fifth target optical signal to obtain the first target optical signal, and reflect the first target optical signal to the optical receiver.

Based on the foregoing technical solutions, in the solution in which the mode converter implements mode division multiplexing and wavelength division multiplexing of the initial optical signal by using the fourth phase pattern, the fourth phase pattern can include the seventh phase pattern and the eighth phase pattern. The seventh phase pattern is used to perform demultiplexing processing on the initial optical signal to obtain the fifth target optical signal. The eighth phase pattern is used to perform phase conversion on the fifth target optical signal, to obtain and reflect the first target optical signal. This provides specific implementations of the seventh phase pattern and the eighth phase pattern in the fourth phase pattern in the mode converter, and improves feasibility of the solution.

In a possible implementation of the second aspect of embodiments of this disclosure, in the first target optical signal, the first optical signal, the second optical signal, and the third optical signal are parallel to each other.

Based on the foregoing technical solutions, in the optical signal receiving device, different optical signals included in the first target optical signal obtained through processing by the mode converter can be parallel to each other. This can avoid optical signal interference between the different optical signals included in the first target optical signal, and improve transmission efficiency of the optical signal.

A third aspect of embodiments of this disclosure provides an optical signal transmission system, including the optical signal transmitting device according to any one of the first aspect and the possible implementations of the first aspect, and/or the optical signal receiving device according to any one of the second aspect and the possible implementations of the second aspect.

It can be learned from the foregoing technical solutions that embodiments of this disclosure have the following advantages: The mode converter in the optical signal transmitting device is configured to perform phase conversion on the multi-path transmitted initial optical signal into the single-path transmitted first target optical signal, where the initial optical signal includes the first optical signal and the second optical signal whose wavelengths are the first wavelength, and the third optical signal whose wavelength is the second wavelength, the first wavelength is different from the second wavelength, and the first target optical signal includes the third optical signal, the first optical signal transmitted in the first mode, and the second optical signal transmitted in the second mode. That is, the optical signal transmitting device can implement, via the mode converter, mode division multiplexing and wavelength division multiplexing of the multi-path transmitted initial optical signal. This expands the capacity of the optical signal transmission system.

DESCRIPTION OF EMBODIMENTS

Figure 1:
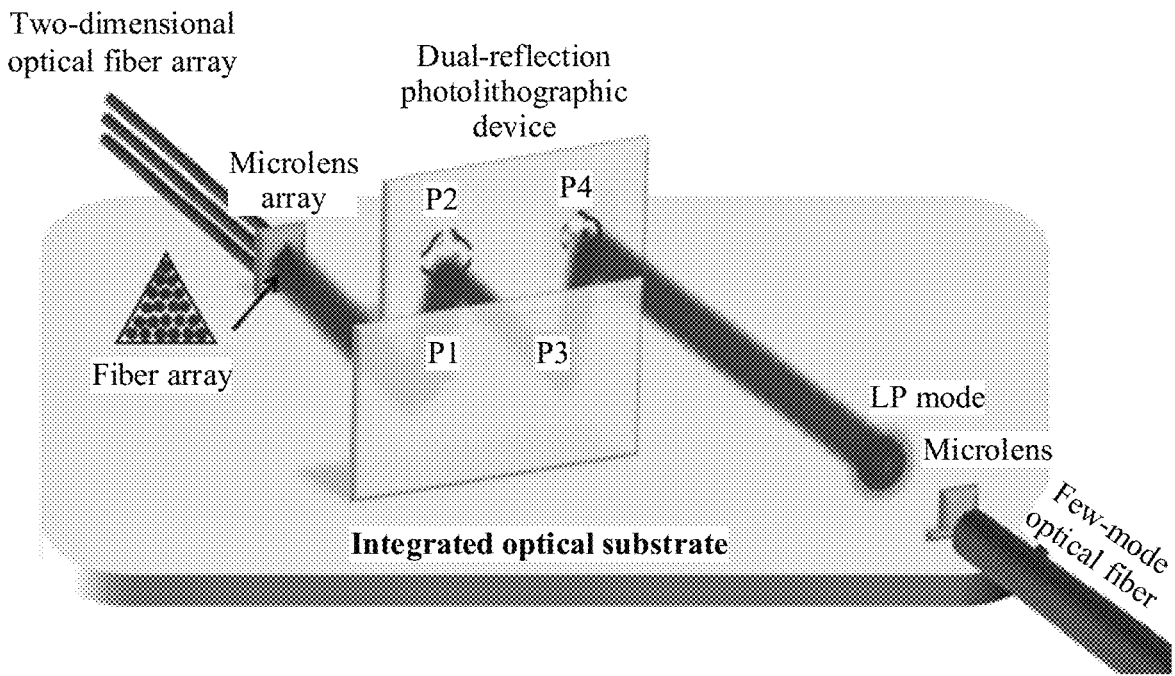
FIG. 1 is a schematic diagram of implementation of a multi-plane light converter MPLC.

The following describes the technical solutions in embodiments of this disclosure with reference to the accompanying drawings in embodiments of this disclosure. It is clear that the described embodiments are merely some rather than all of embodiments of this disclosure. All other embodiments obtained by persons of ordinary skill in the art based on embodiments of this disclosure without creative efforts shall fall within the protection scope of this disclosure.

With the promotion of OM5 multi-mode optical fibers and the large-scale deployment of 40G/100G data center transmission networks, short wavelength division multiplexing (short wavelength division multiplexing, SWDM) technologies are gradually applied. Short wavelength division multiplexing SWDM refers to expanding, by using a wavelength division multiplexing (wavelength division multiplexing, WDM) technology of a single-mode optical fiber, a wavelength range used during transmission from 850 nanometers (nm) used by a conventional multi-mode optical fiber to 850 nm to 950 nm.

Generally, wavelength division multiplexing (WDM) is a technology that two or more optical signals (carrying various information) with different wavelengths are converged at a transmit end via a mux (also referred to as a multiplexer), and are coupled to a same optical fiber of an optical line for transmission. At a receive end, optical carriers of various wavelengths are separated via a demux (also referred to as a de-multiplexer or a demultiplexer), and then are further processed by an optical receiver to restore the original signals. This technology of simultaneously transmitting two or more optical signals with different wavelengths in a same optical fiber is referred to as wavelength division multiplexing. Likewise, in the optical signal transmission field, mode division multiplexing may be a technology of simultaneously transmitting optical signals in two or more different modes in a same optical fiber, where different modes of the optical signals may include a high-order mode, a low-order mode, a ground mode, or another mode.

The following describes applications of a conventional wavelength division multiplexing technology and a conventional mode division multiplexing technology with reference to the accompanying drawing.

Currently, in a data transmission process in which the SWDM technology is applied, a cost-effective short-wave vertical-cavity surface-emitting laser (VCSEL) light source is used to support transmitting data of a plurality of wavelengths on one multi-mode optical fiber, and this can extend a transmission distance while improving an effective modal bandwidth (EMB) of the multi-mode optical fiber. Generally, because a wavelength shift of a VCSEL is 20 nm, to avoid transmission interference between the plurality of wavelengths, the current SWDM technology uses operating wavelengths of 850 nm, 880 nm, 910 nm, and 940 nm (starting from 850 nm, and with one wavelength being added every 30 nm). In a short wavelength division multiplexing module, four VCSELs generate four optical signals with different wavelengths, which are multiplexed onto a single link. All VCSELs are fiber coupled in an optical module. At a receive end of the module, the signals are demultiplexed and converted into parallel electrical signals. Two parallel optical fibers can be used to transmit and receive data.

However, the conventional SWDM technology faces a challenge of capacity expansion. If the four wavelengths are insufficient in the future, more wavelengths need to be added. The VCSEL is used as an example. Because the wavelength shift of VCSEL is 20 nm, and a wavelength spacing is 30 nm, if a wavelength is increased upward, the wavelength is about 1000 nm, but a process limit of a low-cost gallium arsenide (GaAs) material is about 900 nm. If being increased, the wavelength exceeds the limit of the GaAs material. Generally, another material such as indium (In) is doped. As a result, chip costs increase because a production process of a short wavelength is different from that of a long wavelength.

The conventional mode division multiplexing technology may be implemented via a multi-plane optical converter (multi-plane light converter, MPLC). The MPLC is a common implementable mode multiplexing/demultiplexing device. As shown in FIG. 1, a parallel optical fiber array may be converted into coaxial transmission of a plurality of modes at an output end on a plurality of phase planes, where the phase plane is a photolithographic device. The MPLC is classified into a serial type and a reflective type. One MPLC is implemented in the serial type, that is, the parallel optical fiber array is converted into coaxial outputs of the plurality of modes on the plurality of phase planes. A size is large. The other miniaturized MPLC is the reflective type. As shown in FIG. 1, on an integrated optical substrate, a dual-reflection photolithographic device (for example, on a glass sheet) is photoetched with phase arrays of different patterns, for example, P2, P4, P1, and P3 are photoetched at different positions of the same glass sheet, where an optical fiber array can be obtained based on two-dimensional optical fiber arrays of a same wavelength through a microlens array. Then, different LP coaxial transmission modes are output after phase conversion of the four planes P1, P2, P3, and P4, and then transmitted to a few-mode optical fiber through the microlens. However, current research on this method is limited to some application scenarios, for example, mode division multiplexing transmission of a same wavelength in the few-mode optical fiber. Currently, the MPLC is not applied to a plurality of wavelengths.

In conclusion, implementation of the SMWD technology is limited by the technical limit of the VCSEL material, and capacity expansion is challenging. The mode division multiplexing technology can implement only mode division multiplexing of a single wavelength. Currently, a capacity expansion solution of implementing both wavelength division multiplexing and mode division multiplexing is urgently required in the optical fiber data transmission field.

Therefore, embodiments of this disclosure provide an optical signal transmitting device, an optical signal receiving device, and an optical signal transmission system, to implement, via a mode converter, mode division multiplexing and wavelength division multiplexing of a multi-path transmitted optical signal. This expands a capacity of the optical signal transmission system. The following further describes in detail embodiments of this disclosure with reference to the accompanying drawings.

Figure 2:
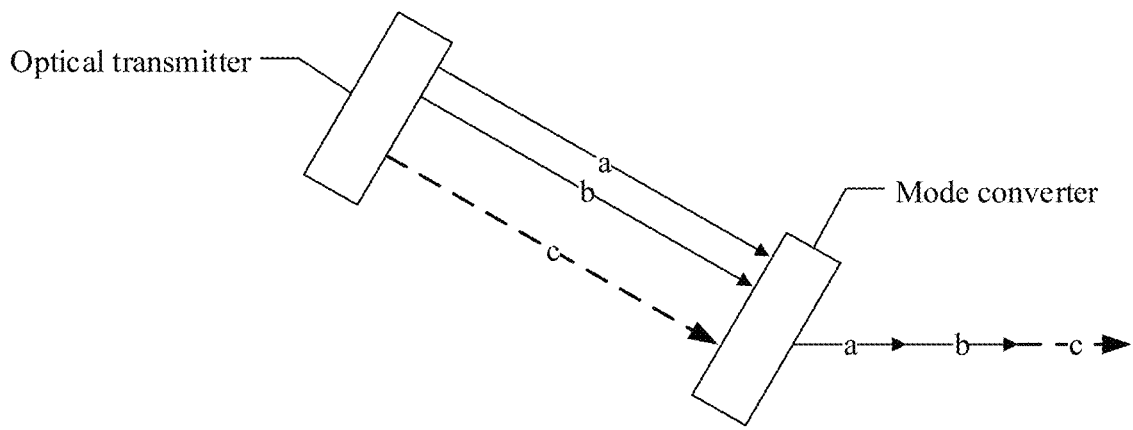
FIG. 2 is a schematic diagram of an optical signal transmitting device according to an embodiment of this disclosure.

Refer to FIG. 2. An embodiment of this disclosure provides an optical signal transmitting device, including:
an optical transmitter and a mode converter.

In the optical signal transmitting device, the optical transmitter is configured to transmit an initial optical signal (an optical path a, an optical path b, and an optical path c) to the mode converter, where the initial optical signal is a multi-path transmitted optical signal, the initial optical signal includes a first optical signal (the optical path a) and a second optical signal (the optical path b) whose wavelengths are a first wavelength, and a third optical signal (the optical path c) whose wavelength is a second wavelength, the first wavelength is different from the second wavelength (in the figure, a solid line in which the optical path a and the optical path b are located represents the first wavelength, and a dashed line in which the optical path c is located represents the second wavelength); and the mode converter is configured to perform phase conversion on the incident initial optical signal, to obtain and reflect a first target optical signal (an optical path abc), where the first target optical signal is a single-path transmitted optical signal, the first target optical signal includes the third optical signal, the first optical signal transmitted in a first mode, and the second optical signal transmitted in a second mode.

The mode converter may directly reflect the obtained first target optical signal (the optical path abc) to an optical fiber for transmission, or perform other processing such as focusing and noise reduction on the obtained first target optical signal (the optical path abc), and then transmit the obtained first target optical signal to an optical fiber for transmission. This is not limited herein.

In this embodiment, the mode converter in the optical signal transmitting device performs phase conversion on the multi-path transmitted initial optical signal (the optical path a, the optical path b, and the optical path c) into the single-path transmitted first target optical signal (namely, the optical path abc). In other words, the optical signal transmitting device implements, via the mode converter, mode division multiplexing and wavelength division multiplexing of the multi-path transmitted initial optical signal. This expands a capacity of an optical signal transmission system.

Specifically, there are at least two paths of optical signals with a same wavelength in the initial optical signal (the optical path a, the optical path b, and the optical path c) transmitted by the optical transmitter. In this embodiment and subsequent embodiments, the at least two paths of optical signals with the same wavelength may be transmitted in a same mode, for example, both are in a high-order mode, a low-order mode, a ground mode, or another mode; or may be transmitted in different transmission modes, for example, a different mode in a high-order mode, a low-order mode, a ground mode, or another mode. This is not limited herein. In addition, in a process in which the initial optical signal is processed by the mode converter to obtain the first target optical signal, a wavelength of each optical signal in the initial optical signal remains unchanged. That is, in the first target optical signal, a wavelength of the first optical signal transmitted in the first mode and a wavelength of the second optical signal transmitted in the second mode are the first wavelength, and a wavelength of the third optical signal is the second wavelength.

It should be noted that, in the schematic diagram shown in FIG. 2, the optical transmitter may transmit at least three paths of optical signals to the mode converter, and at least two paths of optical signals with a same wavelength exist in the at least three paths of optical signals. For example, when the at least three paths of optical signals are eight paths of optical signals, the eight paths of optical signals may be optical signals with seven wavelengths, that is, two optical signals have a same wavelength, and then the mode converter obtains a single-path transmitted optical signal; or the eight paths of optical signals may be optical signals with four wavelengths, each wavelength corresponds to two of the eight paths of optical signals, and then, the mode converter obtains a single-path transmitted optical signal. In this embodiment and subsequent embodiments, three paths of the at least three paths of optical signals (the optical path a, the optical path b, and the optical path c) transmitted by the optical transmitter are used as an example for description. It is apparent that the optical transmitter may further transmit more paths of optical signals, and the mode converter obtains a single-path transmitted optical signal, and details are not described herein again.

In addition, in this embodiment and subsequent embodiments, the optical transmitter may further include a collimating lens group, a focusing lens group, and/or another device used to process the transmitted initial optical signal and then transmit the processed initial optical signal to the mode converter. This is not limited herein.

In the optical signal transmitting device shown in FIG. 2, the mode converter may implement mode division multiplexing and wavelength division multiplexing of the initial optical signal through different combinations of a plurality of components. Descriptions are provided below by using specific examples.

1. The mode converter is implemented by using a phase pattern and a thin film filter (TFF).

In a possible implementation, the mode converter may implement mode division multiplexing and wavelength division multiplexing of the initial optical signal by using a plurality of phase patterns and a plurality of TFFs.

It should be noted that, in this embodiment and subsequent embodiments, the "phase pattern" may be carried on a phase plate of a specified pattern formed by using any pattern generation technology, for example, implemented by using an MPLC, a liquid crystal phase sheet, a supersurface structure, or another technology. Implementation of the technology is not limited herein.

Figure 3:
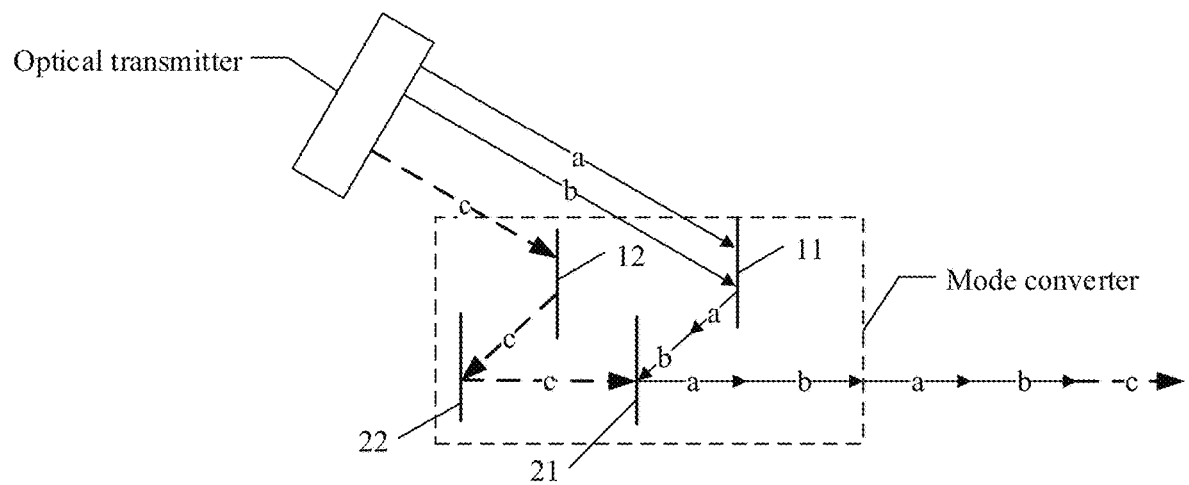
FIG. 3 is another schematic diagram of an optical signal transmitting device according to an embodiment of this disclosure.

An apparatus shown in FIG. 3 is used as an example of implementation. The apparatus includes an optical transmitter and a mode converter. In FIG. 3, the first target optical signal (the optical path abc) includes a second target optical signal (an optical path ab) and a third target optical signal (an optical path c), where the second target optical signal (the optical path ab) and the third target optical signal (the optical path c) each are a single-path transmitted optical signal, the second target optical signal (the optical path ab) includes the first optical signal (the optical path a) that is transmitted in the first mode and whose wavelength is the first wavelength, and the second optical signal (the optical path b) that is transmitted in the second mode and whose wavelength is the first wavelength, and the third target optical signal includes the third optical signal (the optical path c) whose wavelength is the second wavelength.

The mode converter includes a first phase pattern (11), a first thin film filter TFF (21), a second phase pattern (12), and a second TFF (22), where the first TFF (21) is configured to reflect an optical signal of the first wavelength and transmit an optical signal of the second wavelength, and the second TFF (22) is configured to reflect an optical signal of the second wavelength and transmit an optical signal of the first wavelength.

The first phase pattern (11) is used to perform phase conversion on the incident initial optical signal (the optical path a, the optical path b, and the optical path c) to obtain the second target optical signal (the optical path ab), and reflect the second target optical signal (the optical path ab) to the first TFF (21). Then, the first TFF (21) reflects the incident second target optical signal (the optical path ab) along a first axis.

The second phase pattern (12) is used to perform phase conversion on the incident initial optical signal (the optical path a, the optical path b, and the optical path c) to obtain the third target optical signal (the optical path c), and reflect the third target optical signal (the optical path c) to the second TFF (22). Then, the second TFF (22) reflects the incident third target optical signal (the optical path c) to the first TFF (21) along the first axis. Because the first TFF (21) is configured to reflect an optical signal of the first wavelength and transmit an optical signal of the second wavelength, the third target optical signal (the optical path c) may be transmitted through the first TFF (21). Finally, the signals are converged on the same first axis via the mode converter, to reflect the first target optical signal (the optical path abc).

In this embodiment, through implementation of the apparatus shown in FIG. 3, the mode converter can implement mode division multiplexing of the initial optical signal by using the first phase pattern (11) and the second phase pattern (12) based on a difference between the first wavelength and the second wavelength of the initial optical signal (the optical path a, the optical path b, and the optical path c) to obtain the second target optical signal (the optical path ab) and the third target optical signal (the optical path c); and then converge the second target optical signal (the optical path ab) and the third optical signal (the optical path c) along the same first axis by using the first TFF (21) corresponding to the first wavelength and the second TFF (22) corresponding to the second wavelength for reflection to obtain the first target optical signal (the optical path abc). In other words, the optical signal transmitting device implements, via the mode converter, mode division multiplexing and wavelength division multiplexing of the multi-path transmitted initial optical signal. This expands the capacity of the optical signal transmission system.

Figure 4:
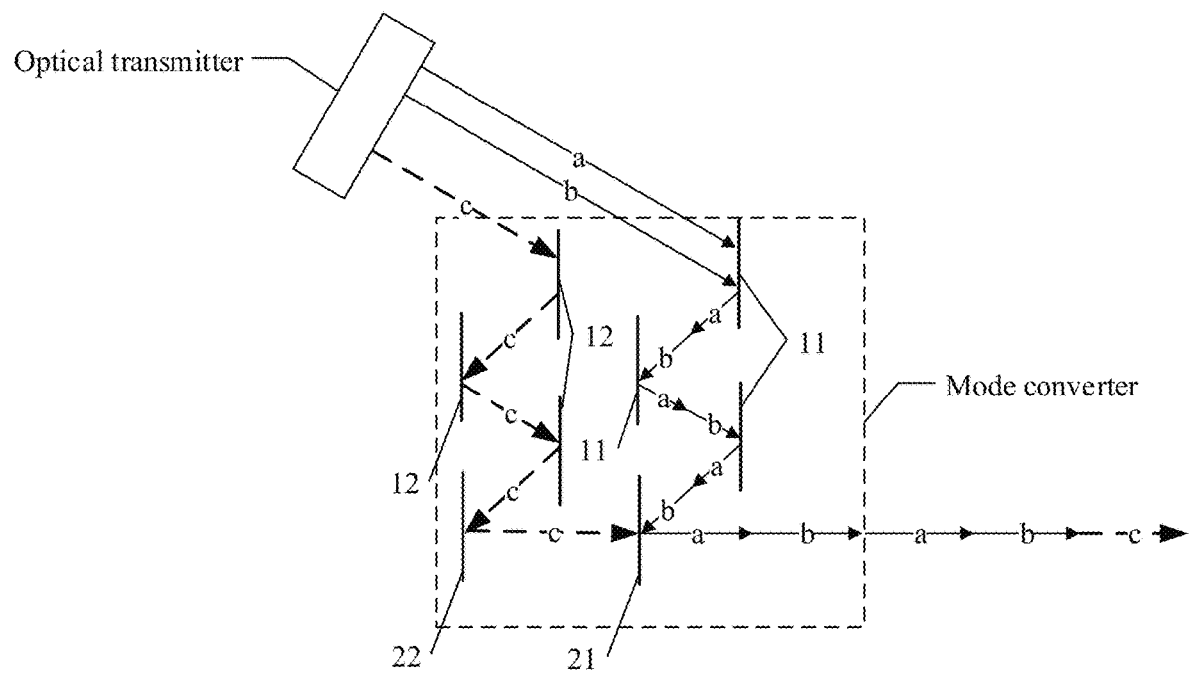
FIG. 4 is another schematic diagram of an optical signal transmitting device according to an embodiment of this disclosure.

In implementation of the apparatus shown in FIG. 3, descriptions are provided by using an example in which the first phase pattern and the second phase pattern each are a separate phase pattern. In another possible implementation process, the first phase pattern and the second phase pattern may be implemented by using a plurality of phase patterns. Refer to FIG. 4.

An apparatus shown in FIG. 4 is used as an example of implementation. The apparatus includes an optical transmitter and a mode converter. In FIG. 4, the first phase pattern (11) may be implemented by using three phase patterns, the second phase pattern (12) may also be implemented by using three phase patterns, and after phase conversion performed by the three phase patterns, a final output is the first target optical signal (the optical path abc).

For example, each of the three phase patterns of the first phase pattern (11) shown in FIG. 4 may be implemented by using a single phase pattern, two phase patterns, or more than three phase patterns. This is not limited herein. Descriptions are provided by using the example in FIG. 4. If the first phase pattern (11) is implemented by using a single phase pattern among the three phase patterns, and the other two phase patterns may be blank phase patterns, and only implement a reflection function of an optical signal, that is, angle adjustment; or if the first phase pattern (11) is implemented by using two of the three phase patterns, and the other phase pattern may be a blank phase pattern, and only implement a reflection function of an optical signal, that is, angle adjustment. Likewise, for implementation of the three phase patterns of the second phase pattern, refer to a plurality of implementations of the three phase patterns of the first phase pattern. Details are not described herein again.

It is apparent that a corresponding quantity of phase patterns may be set according to applications in different scenarios to implement mode division multiplexing and wavelength division multiplexing of the initial optical signal. Details are not described herein again. In addition, different quantities of TFFs may also be set to adapt to different quantities of phase patterns for implementation. For an implementation process, refer to the implementation in FIG. 4. Details are not described herein again.

In a possible implementation, in a scenario in which the mode converter is implemented by using a plurality of phase patterns and a plurality of TFFs, at least one phase pattern of the first phase pattern (11) and at least one phase pattern of the second phase pattern (12) may be integrated on a same phase plate. In other words, in different phase patterns, at least some phase patterns may be integrated on a same phase plate for implementation. This can optimize a spatial layout inside the mode converter, and reduce a volume of the optical signal transmitting device.

Figure 5:
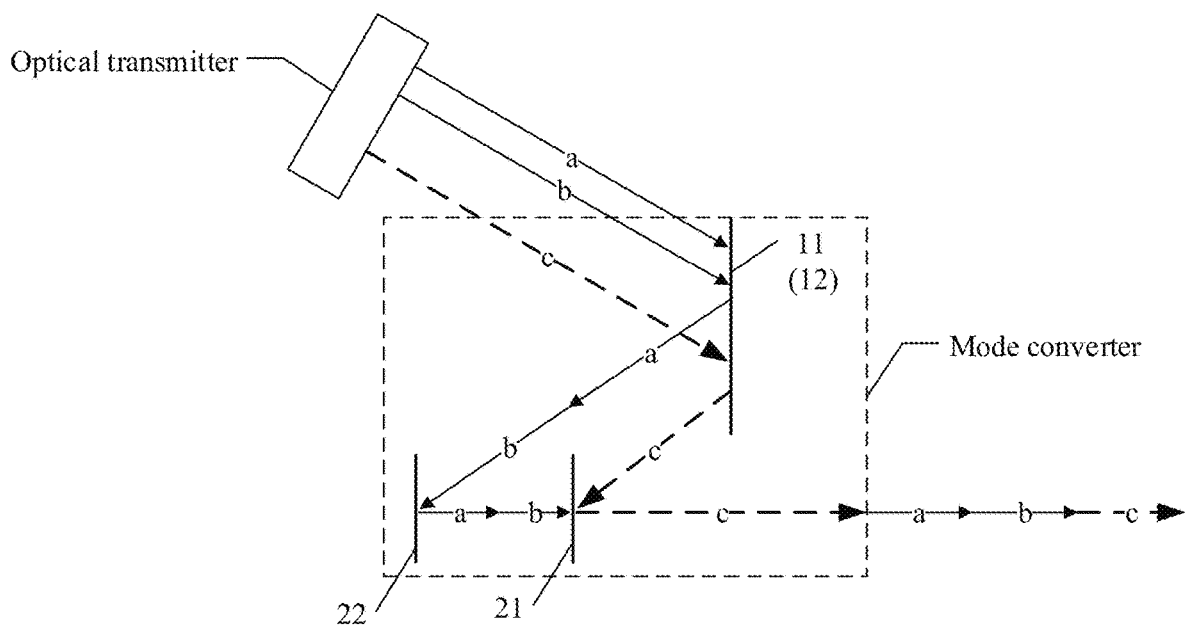
FIG. 5 is another schematic diagram of an optical signal transmitting device according to an embodiment of this disclosure.

An apparatus shown in FIG. 5 is used as an example of implementation. The apparatus includes an optical transmitter and a mode converter. In FIG. 5, the first phase pattern (11) and the second phase pattern (12) are integrated on a same phase plate for implementation, and then the first TFF (21) and the second TFF (21) further perform reflection processing on the signals to obtain the first target optical signal (the optical path abc), and perform a reflection output.

In a possible implementation, in the scenario in which the mode converter is implemented by using the plurality of phase patterns and the plurality of TFFs, at least one phase pattern of the second phase pattern (12) and the first TFF (21) can be integrated on a same phase plate, that is, the phase pattern and the TFF can be integrated on the same phase plate for implementation. This can optimize the spatial layout inside the mode converter, and reduce the volume of the optical signal transmitting device.

Figure 6:
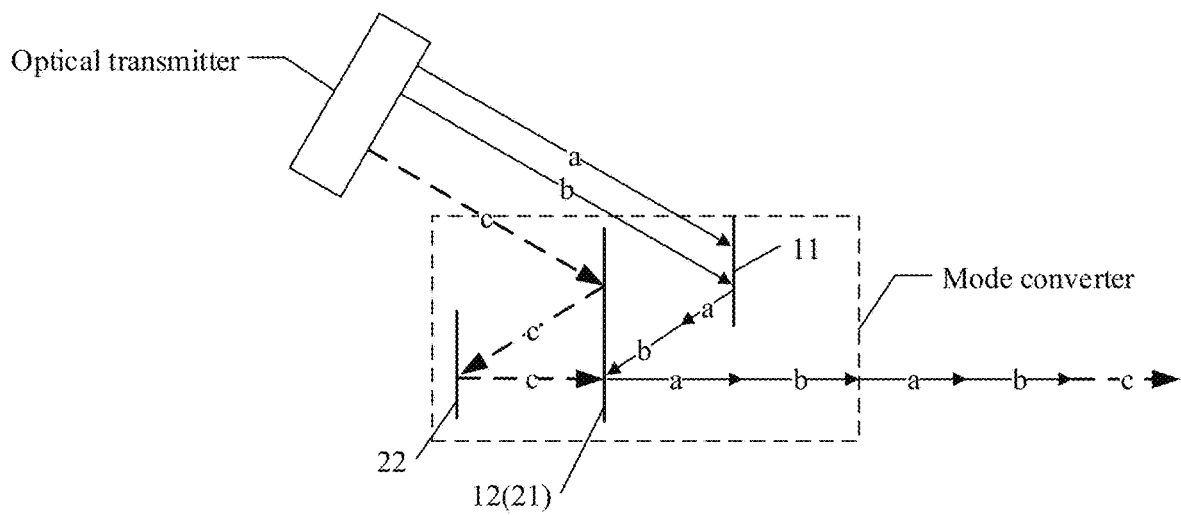
FIG. 6 is another schematic diagram of an optical signal transmitting device according to an embodiment of this disclosure.

An apparatus shown in FIG. 6 is used as an example of implementation. The apparatus includes an optical transmitter and a mode converter. In FIG. 6, the second phase pattern (12) and the first TFF (21) are integrated on a same phase plate for implementation, the first target optical signal (the optical path abc) is obtained after the initial optical signal (the optical path a, the optical path b, and the optical path c) are processed, and a reflection output is performed.

Figure 7:
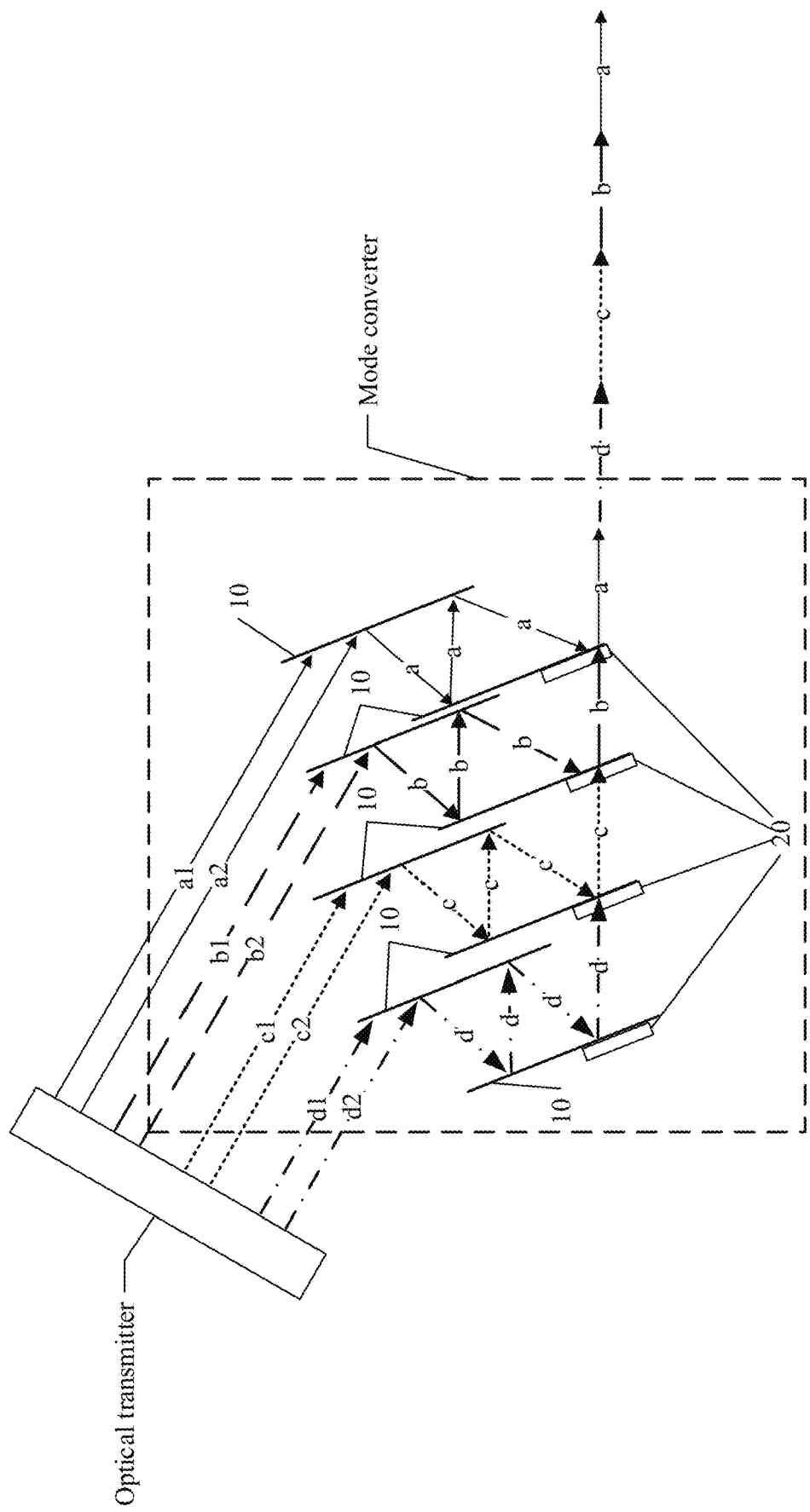
FIG. 7 is another schematic diagram of an optical signal transmitting device according to an embodiment of this disclosure.

Descriptions are provided below by using an example in which there are eight paths of initial optical signals with different wavelengths of $\lambda 1$, $\lambda 2$, $\lambda 3$, and $\lambda 4$. An apparatus shown in FIG. 7 is used as an example of implementation. The apparatus includes an optical transmitter and a mode converter.

In FIG. 7, the initial optical signal transmitted by the optical transmitter includes an optical path a1 and an optical path a2 with a wavelength of $\lambda 1$, an optical path b1 and an optical path b2 with a wavelength of $\lambda 2$, an optical path c1 and an optical path c2 with a wavelength of $\lambda 3$, and an optical path d1 and an optical path d2 with a wavelength of $\lambda 4$. In the mode converter, eight phase plates (10) and four TFFs (20) are included.

For example, two phase plates (10) in the eight phase plates (10) are configured to transmit the optical path a1 and the optical path a2. The optical path a1 and the optical path a2 pass through at least three phase patterns on the two phase plates (10). Descriptions are provided by using an example in which the three phase patterns are P1, P2, and P3. Specifically, in FIG. 7, the optical path a1 and the optical path a2 correspond to the wavelength and are injected into a position of a first phase plate P1, where P1, P2, and P3 are patterns photoetched on the phase plate (10). $\lambda 1$ of two channels of the optical path a1 and the optical path a2 is reflected by P1 to P2 and then reflected to P3. After three times of phase superposition, light reflected from P3 may be converted into two coaxial transmission modes (for example, a 0-order mode Lp01 and a 1-order mode Lp11). The LP01 mode and the Lp11 mode with the wavelength of $\lambda 1$ are injected into the TFF (20), reflected to obtain an optical path a, and then directly injected in the optical fiber later.

In addition, similar to the content shown in FIG. 4, the three phase patterns may include one or two blank phase patterns, to implement only a reflection function of an optical signal, that is, angle adjustment.

In the four TFFs (20), a TFF (20) corresponding to the optical path a is a thin film filter having a function of reflecting $\lambda 1$ and transmitting $\lambda 2$, $\lambda 3$, and $\lambda 4$. This function may be implemented on a second phase plate through film coating or placement. The optical path b1 and the optical path b2 correspond to the wavelength $\lambda 2$, and are injected into the second phase plate. Likewise, different patterns are also photoetched on the second phase plate. After three times of reflection on the phase plane, light is converted into coaxial transmission Lp01 and Lp11 modes of the wavelength of $\lambda 2$. The TFF (20) corresponding to an optical path b is a thin film filter with a function of reflecting $\lambda 2$ and transmitting $\lambda 3$ and $\lambda 4$. The coaxial transmission Lp01 and Lp11 modes of $\lambda 2$ are reflected by the TFF (20) corresponding to the optical path b, and are transmitted to the lens and coupled into the optical fiber through the TFF (20) corresponding to the optical path a. The Lp01 and Lp11 modes of $\lambda 1$ and the Lp01 and Lp11 modes of $\lambda 2$ are multiplexed. Multiplexing of other paths is similar. This can finally implement wavelength multiplexing and mode multiplexing of the multi-path optical signal.

In this embodiment, the phase plate can be implemented via an MPLC. The MPLC is a dual-plane photolithography, where two planes may simultaneously convert modes of two different wavelengths; and is in a multi-path cascaded MPLC structure. The TFF can be mounted on the MPLC, or may be implemented in a manner in which a phase pattern is first photoetched on glass, then a mask template is used to protect an MPLC area, and a thin film filter is plated on a same glass sheet. In this way, the multi-path transmitted optical signal transmitted by the optical transmitter is processed to obtain the single-path transmitted optical signal. That is, this expands the capacity of the optical signal transmission system through mode division multiplexing and wavelength division multiplexing of the multi-path transmitted optical signal.

2. The mode converter is implemented by using a phase pattern and a multiplexer.

In a possible implementation, the mode converter may implement mode division multiplexing and wavelength division multiplexing of the initial optical signal by using one or more phase patterns and a multiplexer.

It should be noted that, in this embodiment and subsequent embodiments, the "phase pattern" may be carried on a phase plate of a specified pattern formed by using any pattern generation technology, for example, implemented by using an MPLC, a liquid crystal phase sheet, a supersurface structure, or another technology. Implementation of the technology is not limited herein. In addition, the multiplexer may be implemented in a plurality of types, for example, implemented by using a multiplexer including a TFF device, or may be implemented by using a multiplexer including another device, for example, a fiber fused biconical, an arrayed waveguide grating, and an optical comb filter. This is not limited herein.

Figure 8:
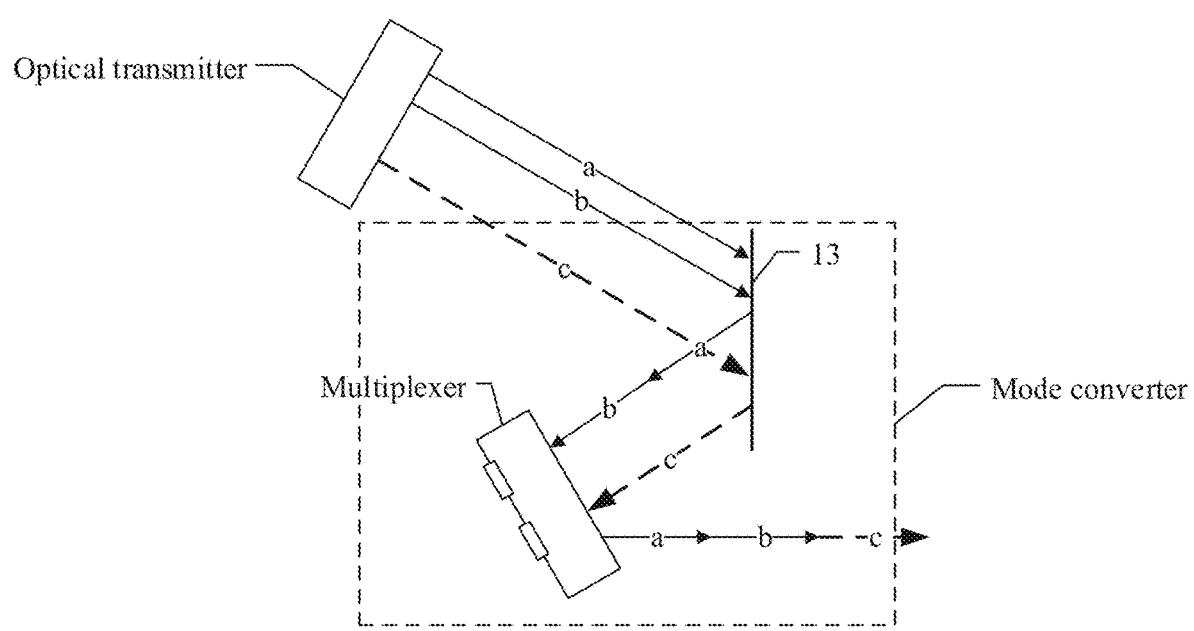
FIG. 8 is another schematic diagram of an optical signal transmitting device according to an embodiment of this disclosure.

An apparatus shown in FIG. 8 is used as an example of implementation. The apparatus includes an optical transmitter and a mode converter. In FIG. 8, the mode converter includes a third phase pattern (13) and a multiplexer. The third phase pattern (13) is used to perform phase conversion on the incident initial optical signal (the optical path a, the optical path b, and the optical path c) to obtain a third target optical signal (an optical path ab and an optical path c), and reflect the third target optical signal (the optical path ab and the optical path c) to the multiplexer, where the third target optical signal (the optical path ab and the optical path c) is a multi-path transmitted optical signals, and the third target optical signal (the optical path ab and the optical path c) includes the first optical signal (the optical path a in the optical path ab) that is transmitted in the first mode and whose wavelength is the first wavelength, the second optical signal (the optical path b in the optical path ab) that is transmitted in the second mode and whose wavelength is the first wavelength, and the third optical signal (the optical path c) whose wavelength is the second wavelength. The multiplexer is configured to perform multiplexing processing on the incident third target optical signal (the optical path ab and the optical path c), to obtain and reflect the first target optical signal (the optical path abc).

The mode converter may directly reflect the obtained first target optical signal (the optical path abc) to an optical fiber for transmission, or perform other processing such as focusing and noise reduction on the obtained first target optical signal (the optical path abc), and then transmit the obtained first target optical signal to an optical fiber for transmission. This is not limited herein. In addition, in an implementation process in which the mode converter includes the third phase pattern and the multiplexer, the apparatus shown in FIG. 8 can first perform phase conversion on the initial optical signal by using the third phase pattern, and then reflect the obtained signal to the multiplexer for multiplexing processing to obtain the first target optical signal; or first perform multiplexing processing on the initial optical signal by using the multiplexer, and then reflect the obtained signals to the third phase pattern for phase conversion to obtain the first target optical signal. This is not limited herein.

In this embodiment, through implementation of the apparatus shown in FIG. 8, the mode converter can perform phase conversion on the initial optical signal (the optical path a, the optical path b, and the optical path c) by using the third phase pattern (13) to obtain the third target optical signal (the optical path ab and the optical path c); and then, converge the third target optical signal (the optical path ab and the optical path c) in the multiplexer by using the multiplexer for reflection to obtain and reflect the first target optical signal (the optical path abc). In other words, the optical signal transmitting device implements, via the mode converter, mode division multiplexing and wavelength division multiplexing of the multi-path transmitted initial optical signal. This expands the capacity of the optical signal transmission system.

In a possible implementation, a quantity of phase patterns in the third phase pattern may be an integer multiple of a quantity of wavelengths of different wavelengths in the initial optical signal. That is, a corresponding quantity of phase patterns may be set in the third phase pattern (13) for the corresponding different wavelengths. For example, when the initial optical signal corresponds to only two wavelengths, namely, the first wavelength and the second wavelength, n phase patterns may be separately set for the optical signals with different wavelengths. In this case, 2n phase patterns are in the third phase pattern (13), where n may be any integer greater than 0. It is apparent that if the initial optical signal corresponds to a plurality of wavelengths, that is, in addition to the first wavelength and the second wavelength, there is the third wavelength, a fourth wavelength, or more different wavelengths, if m wavelengths correspond to the initial optical signal, a quantity of phase patterns in the third phase pattern (13) is a product of m and n, where m is an integer greater than 1, and n may be any integer greater than 0.

In a possible implementation, as shown FIG. 8, the third phase pattern (13) in the mode converter can include a plurality of phase patterns. This can implement mode division multiplexing of the optical signal with different wavelengths by using one or more phase patterns based on different wavelengths of the initial optical signal, that is, implement flexible configuration of the phase patterns based on the different wavelengths of the initial optical signal. For specific implementation of the third phase pattern, refer to an example shown in FIG. 9.

Figure 9:
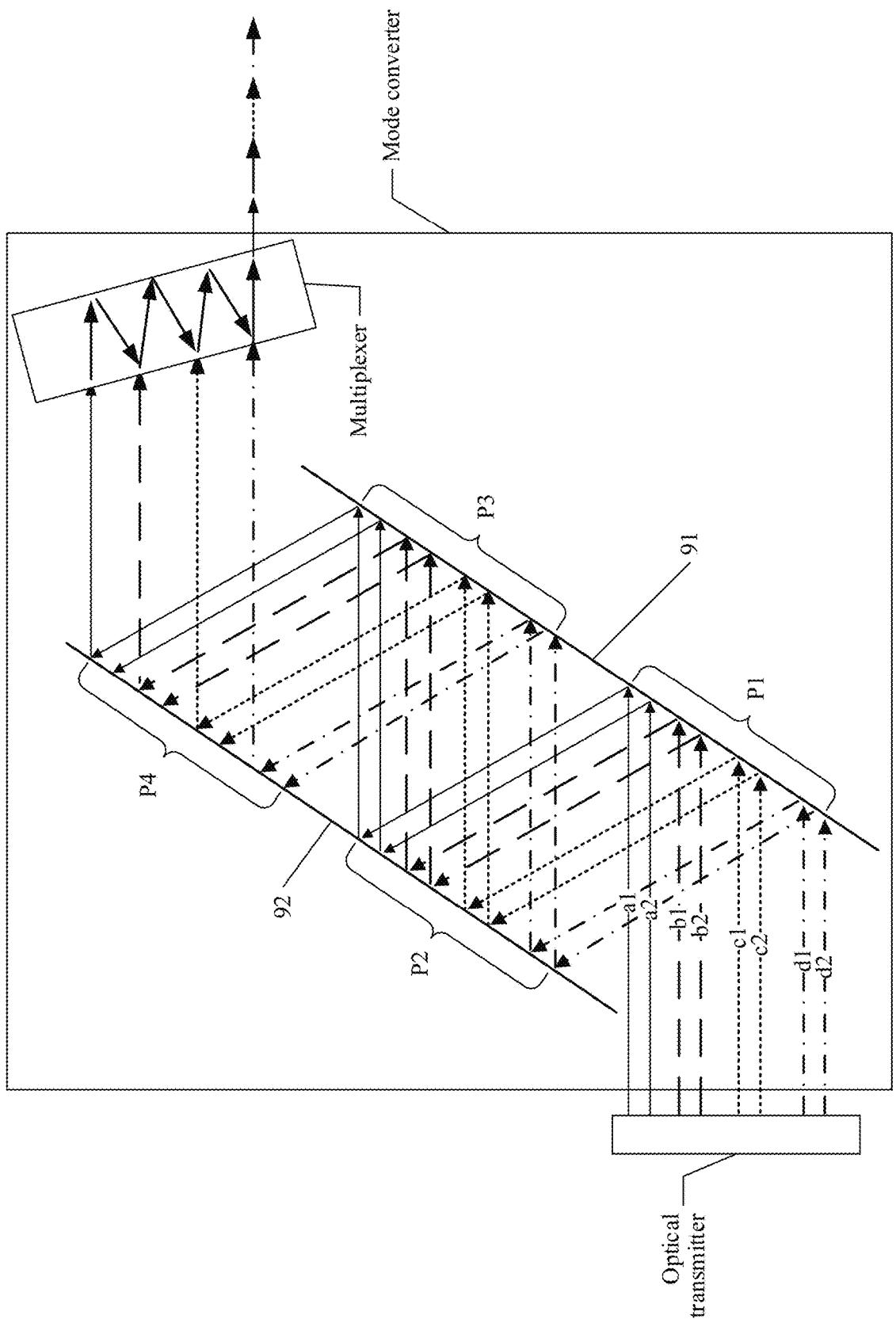
FIG. 9 is another schematic diagram of an optical signal transmitting device according to an embodiment of this disclosure.

An apparatus shown in FIG. 9 is used as an example of implementation. The apparatus includes an optical transmitter and a mode converter. The initial optical signal transmitted by the optical transmitter includes an optical path a1 and an optical path a2 with a wavelength of λ1, an optical path b1 and an optical path b2 with a wavelength of λ2, an optical path c1 and an optical path c2 with a wavelength of λ3, and an optical path d1 and an optical path d2 with a wavelength of λ4. The mode converter includes a phase plate (91), a phase plate (92), and a multiplexer, where the phase plate (91) includes a phase pattern P1 and a phase pattern P3, and the phase plate (92) includes a phase pattern P2 and a phase pattern P4.

Descriptions are provided by using an example of the optical path a1 and the optical path a2 with the wavelength of λ1. λ1 of two channels of the optical path a1 and the optical path a2 is reflected by P1 to P2 to P3, and then reflected to P4. After a plurality of times of phase superposition, light may be converted into two coaxial transmission modes: Lp01 and Lp11, and output to the multiplexer. Likewise, the other six paths (namely, the optical path b1 and the optical path b2 with the wavelength of λ2, the optical path c1 and the optical path c2 with the wavelength of λ3, and the optical path d1 and the optical path d2 with the wavelength of λ4) are the same. After multi-phase conversion, light of Lp01 and Lp11 corresponding to the three wavelengths is output to the spatial multiplexer. Then, the multiplexer multiplexes the four wavelengths. This can finally implement wavelength multiplexing and mode multiplexing of the multi-path optical signal.

3. The mode converter is implemented by using a phase pattern.

In a possible implementation, the mode converter may implement mode division multiplexing and wavelength division multiplexing of the initial optical signal by using one or more phase patterns.

It should be noted that, in this embodiment and subsequent embodiments, the "phase pattern" may be carried on a phase plate of a specified pattern formed by using any pattern generation technology, for example, implemented by using an MPLC, a liquid crystal phase sheet, a supersurface structure, or another technology. Implementation of the technology is not limited herein.

Figure 10:
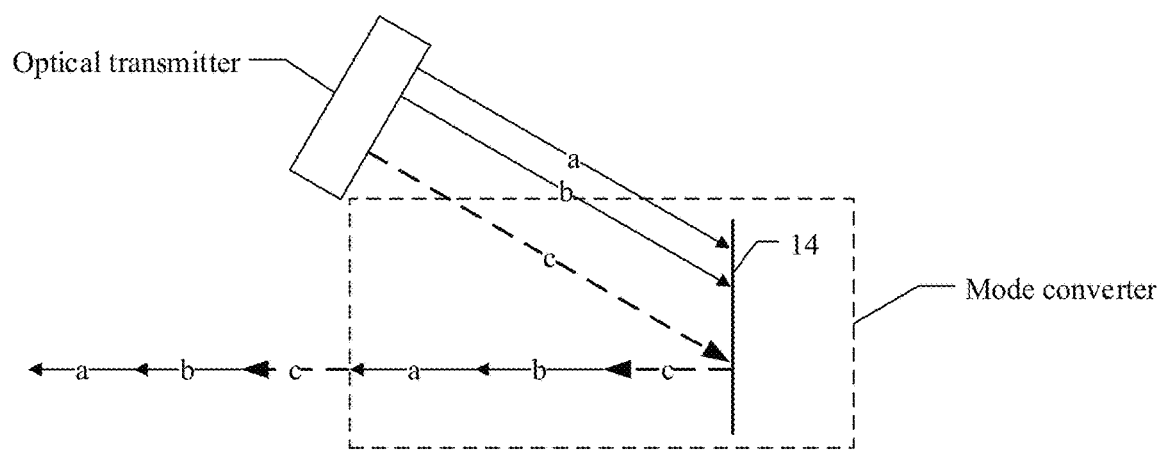
FIG. 10 is another schematic diagram of an optical signal transmitting device according to an embodiment of this disclosure.

An apparatus shown in FIG. 10 is used as an example of implementation. The apparatus includes an optical transmitter and a mode converter. In FIG. 10, the mode converter includes a fourth phase pattern (14), and the fourth phase pattern (14) is used to perform phase conversion on the incident initial optical signal (the optical path a, the optical path b, and the optical path c), to obtain and reflect the first target optical signal (the optical path abc).

The mode converter may directly reflect the obtained first target optical signal (the optical path abc) to an optical fiber for transmission, or perform other processing such as focusing and noise reduction on the obtained first target optical signal (the optical path abc), and then transmit the obtained first target optical signal to an optical fiber for transmission. This is not limited herein.

In this embodiment, through implementation of the apparatus shown in FIG. 10, the mode converter may implement mode division multiplexing and wavelength division multiplexing of the initial optical signal by using the fourth phase pattern (14). In other words, the optical signal transmitting device implements, via the mode converter, mode division multiplexing and wavelength division multiplexing of the multi-path transmitted initial optical signal. This expands the capacity of the optical signal transmission system.

In a possible implementation, based on the solution in which the mode converter in the apparatus shown in FIG. 10 implements mode division multiplexing and wavelength division multiplexing of the initial optical signal by using the fourth phase pattern, when the fourth phase pattern includes a plurality of phase patterns, functional division may be performed on the plurality of phase patterns. The following separately provides descriptions by using apparatuses shown in FIG. 11 and FIG. 12.

Figure 11:
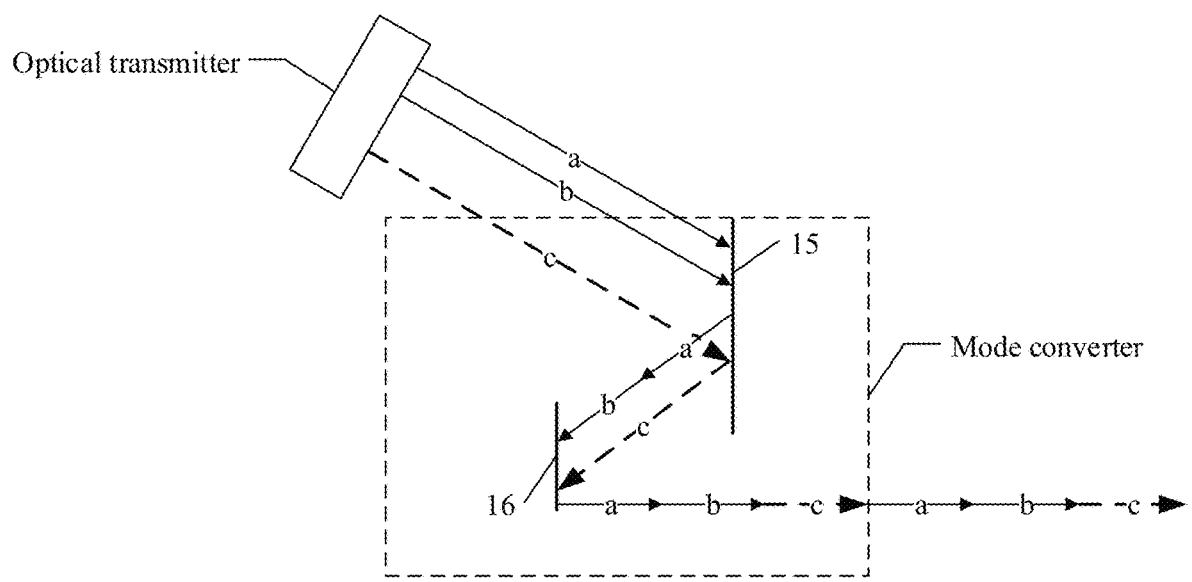
FIG. 11 is another schematic diagram of an optical signal transmitting device according to an embodiment of this disclosure.

An apparatus shown in FIG. 11 is used as an example of implementation. The apparatus includes an optical transmitter and a mode converter. The fourth phase pattern in the mode converter includes a fifth phase pattern (15) and a sixth phase pattern (16). The fifth phase pattern (15) is used to perform phase conversion on the incident initial optical signal (the optical path a, the optical path b, and the optical path c) to obtain a fourth target optical signal (an optical path ab and an optical path c), and reflect the fourth target optical signal (the optical path ab and the optical path c) to the sixth phase pattern (16), where the fourth target optical signal (the optical path ab and the optical path c) is a multi-path transmitted optical signal, and the fourth target optical signal (the optical path ab and the optical path c) includes the first optical signal (the optical path a in the optical path ab) that is transmitted in the first mode and whose wavelength is the first wavelength, the second optical signal (the optical path b in the optical path ab) that is transmitted in the second mode and whose wavelength is the first wavelength, and the third optical signal (the optical path c) whose wavelength is the second wavelength. The sixth phase pattern (16) is used to perform multiplexing processing on the incident fourth target optical signal (the optical path ab and the optical path c), to obtain and reflect the first target optical signal (the optical path abc).

Based on the apparatus shown in FIG. 11, in the solution in which the mode converter implements mode division multiplexing and wavelength division multiplexing of the initial optical signal by using the fourth phase pattern, the fourth phase pattern can include the fifth phase pattern (15) and the sixth phase pattern (16). The fifth phase pattern (15) performs phase conversion on the initial optical signal (the optical path a, the optical path b, and the optical path c) to obtain the fourth target optical signal (the optical path ab and the optical path c), and the sixth phase pattern (16) performs multiplexing processing on the fourth target optical signal (the optical path ab and the optical path c), to obtain and reflect the first target optical signal (the optical path abc).

Figure 12:
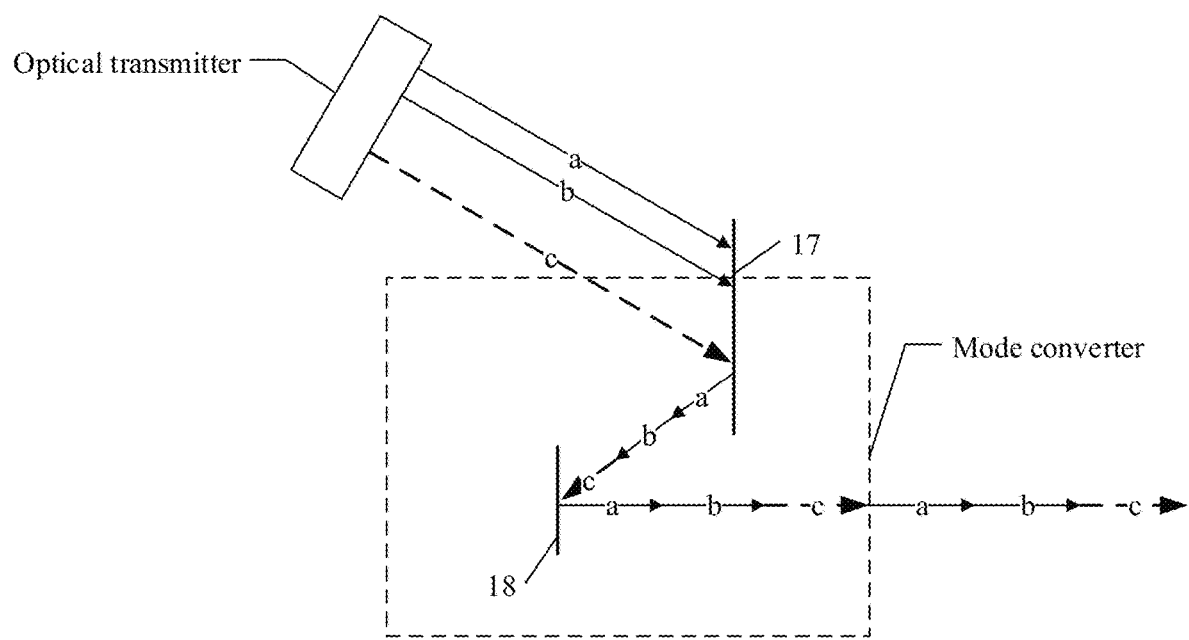
FIG. 12 is another schematic diagram of an optical signal transmitting device according to an embodiment of this disclosure.

An apparatus shown in FIG. 12 is used as an example of implementation. The apparatus includes an optical transmitter and a mode converter. The fourth phase pattern in the mode converter includes a seventh phase pattern (17) and an eighth phase pattern (18). The seventh phase pattern (17) is used to perform multiplexing processing on the incident initial optical signal (the optical path a, the optical path b, and the optical path c) to obtain a fifth target optical signal (an optical path abc), and reflect the fifth target optical signal (the optical path abc) to the eighth phase pattern (18), where the fifth target optical signal (the optical path abc) is a single-path transmitted optical signal, and the fifth target optical signal includes the first optical signal (the optical path a in the optical path abc) and the second optical signal (the optical path b in the optical path abc) whose wavelengths are the first wavelength, and the third optical signal (the optical path c in the optical path abc) whose wavelength is the second wavelength. The eighth phase pattern (18) is used to perform phase conversion on the fifth target optical signal (the optical path abc), to obtain and reflect the first target optical signal (the optical path abc).

Based on the apparatus shown in FIG. 12, in the solution in which the mode converter implements mode division multiplexing and wavelength division multiplexing of the initial optical signal by using the fourth phase pattern, the fourth phase pattern can include the seventh phase pattern (17) and the eighth phase pattern (18). The seventh phase pattern (17) performs multiplexing processing on the initial optical signal (the optical path a, the optical path b, and the optical path c) to obtain the fifth target optical signal (the optical path abc), and the eighth phase pattern (18) performs phase conversion on the fifth target optical signal (the optical path abc), to obtain and reflect the first target optical signal (the optical path abc).

In a possible implementation, as shown in FIG. 10, FIG. 11, and FIG. 12, the fourth phase pattern (14) in the mode converter can include a plurality of phase patterns. This can implement mode division multiplexing of the optical signal with different wavelengths by using one or more phase patterns based on different wavelengths of the initial optical signal, that is, implement flexible configuration of the phase patterns based on the different wavelengths of the initial optical signal. For specific implementation, refer to an example shown in FIG. 13.

Figure 13:
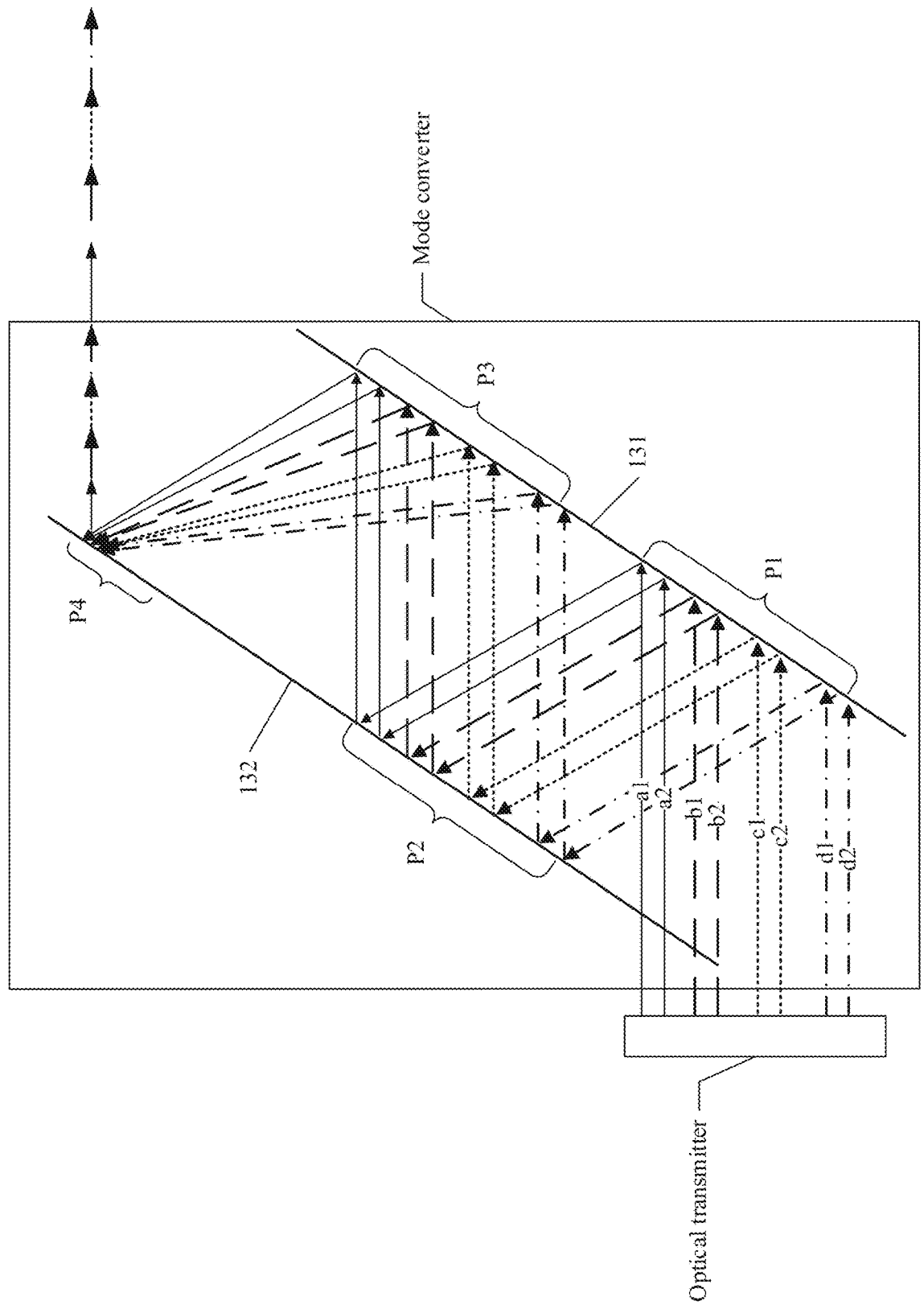
FIG. 13 is another schematic diagram of an optical signal transmitting device according to an embodiment of this disclosure.

An apparatus shown in FIG. 13 is used as an example of implementation. The apparatus includes an optical transmitter and a mode converter. The initial optical signal transmitted by the optical transmitter includes an optical path a1 and an optical path a2 with a wavelength of $\lambda 1$, an optical path b1 and an optical path b2 with a wavelength of $\lambda 2$, an optical path c1 and an optical path c2 with a wavelength of $\lambda 3$, and an optical path d1 and an optical path d2 with a wavelength of $\lambda 4$. The mode converter includes a phase plate (131), a phase plate (132), and a multiplexer, where the phase plate (131) includes a phase pattern P1 and a phase pattern P3, and the phase plate (132) includes a phase pattern P2 and a phase pattern P4.

Descriptions are provided by using an example of the optical path a1 and the optical path a2 with the wavelength of $\lambda 1$. $\lambda 1$ of two channels of the optical path a1 and the optical path a2 is reflected by P1 to P2 to P3, and then reflected to P4. After a plurality of times of phase superposition, light may be converted into two coaxial transmission modes (Lp01 and Lp11) for reflection and output. Likewise, the other six paths (namely, the optical path b1 and the optical path b2 with the wavelength of λ2, the optical path c1 and the optical path c2 with the wavelength of λ3, and the optical path d1 and the optical path d2 with the wavelength of λ4) are the same. After multi-phase conversion, optical signals of Lp01 and Lp11 corresponding to the three wavelengths are output for reflection and output. Similar to the apparatus shown in FIG. 9, a difference lies in that phase reflection is designed by using a pattern of each channel, so that the four wavelengths reach a same P4 phase point at a last reflection location, and coaxial transmission is implemented at the last reflection. This can finally implement wavelength multiplexing and mode multiplexing of the multi-path optical signal.

In a possible implementation, in the apparatus shown in FIG. 2 to FIG. 13, in the optical signal transmitting device, different optical signals (namely, the first optical signal, the second optical signal, and the third optical signal) included in the initial optical signal transmitted by the optical transmitter may be parallel to each other. This can avoid optical signal interference between the different optical signals included in the initial optical signal, and improve optical signal transmission efficiency.

Figure 14:
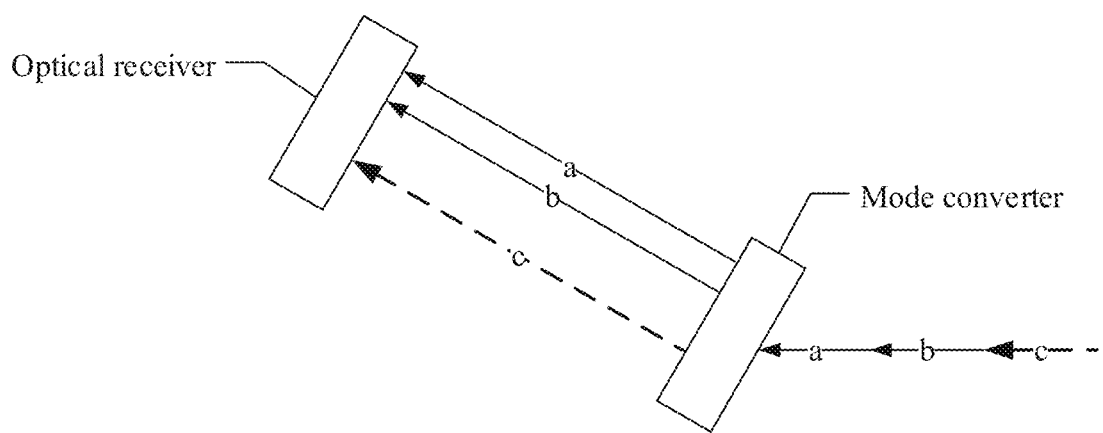
FIG. 14 is a schematic diagram of an optical signal receiving device according to an embodiment of this disclosure.

Refer to FIG. 14. An embodiment of this disclosure provides an optical signal receiving device, including:

an optical receiver and a mode converter.

In the optical signal receiving device, the mode converter is configured to perform phase conversion on an incident initial optical signal (an optical path abc) to obtain a first target optical signal (an optical path a, an optical path b, and an optical path c), and reflect the first target optical signal (the optical path a, the optical path b, and the optical path c) to the optical receiver, where the initial optical signal (the optical path abc) is a single-path transmitted optical signal, the initial optical signal (the optical path abc) includes a first optical signal (the optical path a in the optical path abc) that is transmitted in a first mode and whose wavelength is a first wavelength, a second optical signal (the optical path b in the optical path abc) that is transmitted in a second mode and whose wavelength is the first wavelength, and a third optical signal (the optical path c in the optical path abc) whose wavelength is a second wavelength, the first target optical signal (the optical path a, the optical path b, and the optical path c) is a multi-path transmitted optical signal, the first target optical signal (the optical path a, the optical path b, and the optical path c) includes the first optical signal (the optical path a) and the second optical signal (the optical path b) whose wavelengths are the first wavelength, and the third optical signal (the optical path c) whose wavelength is the second wavelength, and the first wavelength is different from the second wavelength.

In this embodiment, the mode converter in the optical signal receiving device performs phase conversion on the single-path transmitted initial optical signal (the optical path abc) into the multi-path transmitted first target optical signal (the optical path a, the optical path b, and the optical path c). That is, the optical signal receiving device implements, via the mode converter, mode division multiplexing and wavelength division multiplexing of the single-path transmitted initial optical signal. This expands a capacity of an optical signal transmission system.

Specifically, there are at least two paths of optical signals with a same wavelength in the first target optical signal (the optical path a, the optical path b, and the optical path c) received by the optical receiver. In this embodiment and subsequent embodiments, the at least two paths of optical signals with the same wavelength may be transmitted in a same mode, for example, both are in a high-order mode, a low-order mode, a ground mode, or another mode; or may be transmitted in different transmission modes, for example, a different mode in a high-order mode, a low-order mode, a ground mode, or another mode. This is not limited herein. In addition, in a process in which the initial optical signal is processed by the mode converter to obtain the first target optical signal, a wavelength of each optical signal in the initial optical signal remains unchanged. That is, in the first target optical signal, a wavelength of the first optical signal and a wavelength of the second optical signal are the first wavelength, and a wavelength of the third optical signal is the second wavelength.

Specifically, based on a principle of reversibility of light, a process in which the optical signal receiving device shown in FIG. 14 converts the single-path transmitted initial optical signal to obtain the multi-path transmitted first target optical signal is the same as a process in which the optical signal transmitting device shown in FIG. 2 converts the multi-path transmitted initial optical signal to obtain the single-path transmitted first target optical signal. To be specific, the optical signal receiving device shown in FIG. 14 may further implement another extension solution implemented by the light signal transmitting device shown in FIG. 2, that is, may implement embodiments shown in FIG. 3 to FIG. 13, and implement beneficial effects of embodiments corresponding to FIG. 3 to FIG. 13.

In addition, there are at least two paths of optical signals with a same wavelength in the first target optical signal (the optical path a, the optical path b, and the optical path c) received by the optical receiver. In this embodiment and subsequent embodiments, the at least two paths of optical signals with the same wavelength may be transmitted in a same mode, for example, both are in a high-order mode, a low-order mode, a ground mode, or another mode; or may be transmitted in different transmission modes, for example, a different mode in a high-order mode, a low-order mode, a ground mode, or another mode. This is not limited herein.

Refer to embodiments shown in FIG. 3 to FIG. 13. The light signal receiving device shown in FIG. 14 may further implement at least the following technical solutions.

In a possible implementation, the first target optical signal includes a second target optical signal and a third optical signal, and the second target optical signal and the third target optical signal each are a multi-path transmitted optical signal. The second target optical signal includes the first optical signal and the second optical signal whose wavelengths are the first wavelength, and the third target optical signal includes the third optical signal whose wavelength is the second wavelength. The mode converter includes a first phase pattern, a first thin film filter TFF, a second phase pattern, and a second TFF. The first TFF is configured to reflect an optical signal of the first wavelength and transmit an optical signal of the second wavelength, and the second TFF is configured to reflect an optical signal of the second wavelength and transmit an optical signal of the first wavelength. After the first TFF receives the initial optical signal through the first axis, and reflects the initial optical signal to the first phase pattern, the first phase pattern is used to perform phase conversion on the incident initial optical signal to obtain the second target optical signal, and reflect the second target optical signal to the optical receiver. After the second TFF receives the initial optical signal through the first axis, and reflects the initial optical signal to the second phase pattern, the second phase pattern is used to perform phase conversion on the incident initial optical signal to obtain the third target optical signal, and reflect the third target optical signal to the optical receiver.

Based on the foregoing technical solutions, the mode converter can receive the initial optical signal by using the first TFF corresponding to the first wavelength and the second TFF corresponding to the second wavelength and through the first axis, and separately reflect the initial optical signal obtained after filtering to the first phase pattern and the second phase pattern; and then, decompose the filtered initial optical signal into the second target optical signal and the third target optical signal separately by using the first phase pattern and the second phase pattern, so that the optical receiver obtains the first target optical signal based on the second target optical signal and the third target optical signal. This provides a specific implementation of mode division multiplexing and wavelength division multiplexing of the initial optical signal by using a plurality of phase patterns and a plurality of TFFs in the mode converter, and improves feasibility of the solution.

In a possible implementation, at least one phase pattern of the first phase pattern and at least one phase pattern of the second phase pattern are integrated on a same phase plate.

Based on the foregoing technical solutions, in a scenario in which the mode converter is implemented by using the plurality of phase patterns and the plurality of TFFs, the at least one phase pattern of the first phase pattern and the at least one phase pattern of the second phase pattern can be integrated on the same phase plate. In other words, in different phase patterns, at least some phase patterns may be integrated on a same phase plate for implementation. This can optimize a spatial layout inside the mode converter, and reduce a volume of the optical signal receiving device.

In a possible implementation, the at least one phase pattern of the second phase pattern and the first TFF are integrated on a same phase plate.

Based on the foregoing technical solutions, in the scenario in which the mode converter is implemented by using the plurality of phase patterns and the plurality of TFFs, the at least one phase pattern of the second phase pattern and the first TFF are integrated on the same phase plate, that is, the phase pattern and the TFF can be integrated on the same phase plate for implementation. This can optimize the spatial layout inside the mode converter, and reduce the volume of the optical signal receiving device.

In a possible implementation, the mode converter includes a third phase pattern and a demultiplexer; the demultiplexer is configured to: perform demultiplexing processing on the incident initial optical signal to obtain a third target optical signal, and reflect the third target optical signal to the third phase pattern, where the third target optical signal is a multi-path transmitted optical signal, and the third target optical signal includes the first optical signal and the second optical signal whose wavelengths are the first wavelength, and the third optical signal whose wavelength is the second wavelength; and the third phase pattern is used to perform phase conversion on the incident third target optical signal to obtain the first target optical signal, and reflect the first target optical signal to the optical receiver.

Based on the foregoing technical solutions, the mode converter can decompose, via the demultiplexer, the initial optical signal into the multi-path transmitted third target optical signal, and reflect the third target optical signal to the third phase pattern; and then, implement mode division multiplexing of and perform phase conversion on the third target optical signal by using the third phase pattern to obtain the first target optical signal. This provides a specific implementation of mode division multiplexing and wavelength division multiplexing of the initial optical signal by using the demultiplexer and the phase pattern in the mode converter, and improves feasibility of the solution.

In a possible implementation, a quantity of phase patterns in the third phase pattern is an integer multiple of a quantity of wavelengths corresponding to the initial optical signal.

Based on the foregoing technical solutions, the third phase pattern in the mode converter can include a plurality of phase patterns. This can implement mode division multiplexing of the optical signal with different wavelengths by using one or more phase patterns based on different wavelengths of the initial optical signal, that is, implement flexible configuration of the phase patterns based on the different wavelengths of the initial optical signal.

In a possible implementation, the mode converter includes a fourth phase pattern, and the fourth phase pattern is used to perform phase conversion on the incident initial optical signal to obtain the first target optical signal, and reflect the first target optical signal to the optical receiver.

Based on the foregoing technical solutions, the mode converter can implement mode division multiplexing and wavelength division multiplexing of the initial optical signal by using the fourth phase pattern. This provides a specific implementation of mode division multiplexing and wavelength division multiplexing of the initial optical signal by using the phase pattern in the mode converter, and improves feasibility of the solution.

In a possible implementation, the fourth phase pattern includes a fifth phase pattern and a sixth phase pattern; the fifth phase pattern is used to perform phase conversion on the incident initial optical signal to obtain a fourth target optical signal, and reflect the fourth target optical signal to the sixth phase pattern, where the fourth target optical signal is a single-path transmitted optical signal, and the fourth target optical signal includes the first optical signal and the second optical signal whose wavelengths are the first wavelength, and the third optical signal whose wavelength is the second wavelength; and the sixth phase pattern is used to perform demultiplexing processing on the incident fourth target optical signal to obtain the first target optical signal, and reflect the first target optical signal to the optical receiver.

Based on the foregoing technical solutions, in the solution in which the mode converter implements mode division multiplexing and wavelength division multiplexing of the initial optical signal by using the fourth phase pattern, the fourth phase pattern can include the fifth phase pattern and the sixth phase pattern. The fifth phase pattern is used to perform phase conversion on the initial optical signal to obtain the fourth target optical signal. The sixth phase pattern is used to perform demultiplexing processing on the fourth target optical signal, to obtain and reflect the first target optical signal. This provides specific implementations of the fifth phase pattern and the sixth phase pattern in the fourth phase pattern in the mode converter, and improves feasibility of the solution.

In a possible implementation, the fourth phase pattern includes a seventh phase pattern and an eighth phase pattern; the seventh phase pattern is used to perform demultiplexing processing on the incident initial optical signal to obtain a fifth target optical signal, and reflect the fifth target optical signal to the eighth phase pattern, where the fifth target optical signal is a multi-path transmitted optical signal, and the fifth target optical signal includes the first optical signal that is transmitted in the first mode and whose wavelength is the first wavelength, the second optical signal that is transmitted in the second mode and whose wavelength is the first wavelength, and the third optical signal whose wavelength is the second wavelength; and the eighth phase pattern is used to perform phase conversion on the incident fifth target optical signal to obtain the first target optical signal, and reflect the first target optical signal to the optical receiver.

Based on the foregoing technical solutions, in the solution in which the mode converter implements mode division multiplexing and wavelength division multiplexing of the initial optical signal by using the fourth phase pattern, the fourth phase pattern can include the seventh phase pattern and the eighth phase pattern. The seventh phase pattern is used to perform demultiplexing processing on the initial optical signal to obtain the fifth target optical signal. The eighth phase pattern is used to perform phase conversion on the fifth target optical signal, to obtain and reflect the first target optical signal. This provides specific implementations of the seventh phase pattern and the eighth phase pattern in the fourth phase pattern in the mode converter, and improves feasibility of the solution.

In a possible implementation, in the first target optical signal, the first optical signal, the second optical signal, and the third optical signal are parallel to each other.

Based on the foregoing technical solutions, in the optical signal receiving device, different optical signals included in the first target optical signal obtained through processing by the mode converter can be parallel to each other. This can avoid optical signal interference between the different optical signals included in the first target optical signal, and improve transmission efficiency of the optical signal.

The foregoing embodiments are merely intended for describing the technical solutions of this disclosure rather than limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. An optical signal transmitting device comprising:
   an optical transmitter; and
   a mode converter, comprising:
      first and second thin film filters (TFFs);
      first and second phase patterns disposed to receive an initial optical signal and to reflect the initial optical signal to the first and second TFFs, respectively, wherein the first and second TFFs are disposed to receive the reflected initial optical signals and to reflect the received reflected optical signals along a single path;
   wherein the optical transmitter is configured to:
      transmit the initial optical signal to the mode converter, wherein the initial optical signal is a multi-path transmitted optical signal and comprises a first optical signal and a second optical signal of a first wavelength, and a third optical signal of a second wavelength different from the first wavelength,
   wherein the mode converter is configured to:
      perform phase conversion on the initial optical signal to produce a first target optical signal, wherein the first target optical signal is a single-path transmitted optical signal and comprises the first optical signal, and the second optical signal transmitted and the third optical signal.

2. The device according to claim 1, wherein the the first TFF is configured to reflect an optical signal of the first wavelength and transmit an optical signal of the second wavelength, and the second TFF is configured to reflect an optical signal of the second wavelength and transmit an optical signal of the first wavelength, and
   wherein after the first phase pattern performs phase conversion on the initial optical signal to obtain a second target optical signal and reflect the second target optical signal to the first TFF, the first TFF reflects the incident second target optical signal along a first axis, wherein the second target optical signal is a single-path transmitted optical signal and comprises the first optical signal transmitted in the first mode and the second optical signal transmitted in the second mode; and
   after the second phase pattern performs phase conversion on the initial optical signal to obtain the third optical signal and reflect the third optical signal to the second TFF, the second TFF reflects the target optical signal to the first TFF along the first axis.

3. The device according to claim 2, wherein the first phase pattern and the second phase pattern are integrated on a same phase plate.

4. The device according to claim 2, wherein the second phase pattern and the first TFF are integrated on a same phase plate.

5. The device according to claim 1, wherein the first optical signal, the second optical signal, and the third optical signal in the initial optical signal are parallel to each other.

6. An optical signal transmitting device comprising:
   an optical transmitter; and
   a mode converter, comprising:
      first and second thin film filters (TFFs);
      first and second phase patterns disposed to receive an initial optical signal and to reflect the initial optical signal to the first and second TFFs, respectively, wherein the first and second TFFs are disposed to receive the reflected initial optical signals and to reflect the received reflected optical signals;
      third and fourth thin film filters (TFFs);
      third and fourth phase patterns disposed to receive the initial optical signal from the first and second TFFs and to reflect the initial optical signal to the third and fourth TFFs, respectively, wherein the third and fourth TFFs are disposed to receive the reflected initial optical signals and to reflect the received reflected optical signals along a single path; and
   wherein the optical transmitter is configured to:
      transmit the initial optical signal to the mode converter, wherein the initial optical signal is a multi-path transmitted optical signal and comprises a first optical signal and a second optical signal of a first wavelength, and a third optical signal of a second wavelength different from the first wavelength,
   wherein the mode converter is configured to:
      perform phase conversion on the incident initial optical signal to produce a first target optical signal, wherein the first target optical signal is a single-path transmitted optical signal and comprises the first optical signal, and the second optical signal transmitted and the third optical signal.

7. The device according to claim 6, wherein the mode converter comprises a fifth phase pattern and a sixth phase pattern, wherein the fifth phase pattern performs phase conversion on the initial optical signal to obtain a fourth target optical signal, and reflect the fourth target optical signal to the sixth phase pattern, wherein the fourth target optical signal is a multi-path transmitted optical signal, and the fourth target optical signal comprises the third optical signal, the first optical signal transmitted in the first mode, and the second optical signal transmitted in the second mode, and wherein the sixth phase pattern performs multiplexing processing on the incident fourth target optical signal to obtain and reflect the first target optical signal.

8. The device according to claim 7, wherein the mode converter comprises a seventh phase pattern and an eighth phase pattern, wherein the seventh phase pattern performs multiplexing processing on the initial optical signal to obtain a fifth target optical signal and reflect the fifth target optical signal to the eighth phase pattern, wherein the fifth target optical signal is a single-path transmitted optical signal and comprises the first optical signal, the second optical signal, and the third optical signal, and wherein the eighth phase pattern performs phase conversion on the fifth target optical signal to obtain and reflect the first target optical signal.

9. An optical signal receiving device comprising:
an optical receiver;
a mode converter comprises:
first and second thin film filters (TFFs) disposed to receive an initial optical signal along a single path wherein the first and second TFFs are disposed to receive the initial optical signals and to reflect the received initial optical signals to first and second phase patterns which are disposed to receive the reflected initial optical signals from the TFFs to the optical receiver; and wherein the mode converter is configured to:
perform phase conversion on an initial optical signal to obtain a first target optical signal from the TFFs and reflect the first target optical signal to the optical receiver, wherein the initial optical signal is a single-path transmitted optical signal and comprises a first optical signal that is transmitted in a first mode and of a first wavelength, a second optical signal that is transmitted in a second mode and of the first wavelength, and a third optical signal of a second wavelength different from the first wavelength, the first target optical signal is a multi-path transmitted optical signal and comprises the first optical signal, the second optical signal, and the third optical signal.

10. The device according to claim 9, wherein the first TFF reflects an optical signal of the first wavelength and transmit an optical signal of the second wavelength, and the second TFF reflects an optical signal of the second wavelength and transmit an optical signal of the first wavelength, wherein after the first TFF receives the initial optical signal through a first axis and reflects the initial optical signal to the first phase pattern, the first phase pattern performs phase conversion on the initial optical signal to obtain a second target optical signal and reflect the second target optical signal to the optical receiver, wherein the second target optical signal is a multi-path transmitted optical signal and comprises the first optical signal and the second optical signal, and after the second TFF receives the initial optical signal through the first axis and reflects the initial optical signal to the second phase pattern, the second phase pattern performs phase conversion on the initial optical signal to obtain the third optical signal and reflect the third optical signal to the optical receiver.

11. The device according to claim 10, wherein the first phase pattern and the second phase pattern are integrated on a same phase plate.

12. The device according to claim 10, wherein the second phase pattern and the first TFF are integrated on a same phase plate.

13. The device according to claim 9, wherein the mode converter comprises a third phase pattern and a demultiplexer, wherein the demultiplexer is configured to:
perform demultiplexing processing on the initial optical signal to obtain a third target optical signal; and
reflect the third target optical signal to the third phase pattern, wherein the third target optical signal is a multi-path transmitted optical signal and comprises the third optical signal, the first optical signal transmitted in the first mode, and the second optical signal transmitted in the second mode, and wherein the third phase pattern performs phase conversion on the third target optical signal to obtain the first target optical signal and reflect the first target optical signal to the optical receiver.

14. The device according to claim 13, wherein a quantity of phase patterns in the third phase pattern is an integer multiple of a quantity of wavelengths corresponding to the initial optical signal.

15. The device according to claim 9, wherein the mode converter comprises a fourth phase pattern, and the fourth phase pattern performs phase conversion on the initial optical signal to obtain the first target optical signal and reflect the first target optical signal to the optical receiver.

16. The device according to claim 15, wherein the fourth phase pattern comprises a fifth phase pattern and a sixth phase pattern, wherein the fifth phase pattern performs phase conversion on the incident initial optical signal to obtain a fourth target optical signal, and reflect the fourth target optical signal to the sixth phase pattern, wherein the fourth target optical signal is a single-path transmitted optical signal and comprises the first optical signal, the second optical signal, and the third optical signal, and wherein the sixth phase pattern performs demultiplexing processing on the fourth target optical signal to obtain the first target optical signal and reflect the first target optical signal to the optical receiver.

17. The device according to claim 15, wherein the fourth phase pattern comprises a seventh phase pattern and an eighth phase pattern, wherein the seventh phase pattern performs demultiplexing processing on the initial optical signal to obtain a fifth target optical signal and reflect the fifth target optical signal to the eighth phase pattern, wherein the fifth target optical signal is a multi-path transmitted optical signal and comprises the third optical signal, the first optical signal transmitted in the first mode, and the second optical signal transmitted in the second mode, and wherein the eighth phase pattern performs phase conversion on the fifth target optical signal to obtain the first target optical signal and reflect the first target optical signal to the optical receiver.

18. The device according to claim 9, wherein the first optical signal, the second optical signal, and the third optical signal in the first target optical signal are parallel to each other.

* * * * *